United States Patent
Hsieh et al.

(10) Patent No.: US 9,990,152 B1
(45) Date of Patent: Jun. 5, 2018

(54) DATA WRITING METHOD AND STORAGE CONTROLLER

(71) Applicant: EpoStar Electronics Corp., Hsinchu (TW)

(72) Inventors: Hung-Chih Hsieh, Hsinchu County (TW); Yu-Hua Hsiao, Hsinchu County (TW); Shih-Tien Liao, Hsinchu (TW)

(73) Assignee: EpoStar Electronics Corp., Hsinchu (TW)

( * ) Notice: Subject to any disclaimer, the term of this patent is extended or adjusted under 35 U.S.C. 154(b) by 37 days.

(21) Appl. No.: 15/402,239

(22) Filed: Jan. 10, 2017

(30) Foreign Application Priority Data

Nov. 17, 2016 (TW) .............................. 105137591 A

(51) Int. Cl.
*G06F 3/06* (2006.01)
*G06F 17/30* (2006.01)
*G06F 7/50* (2006.01)
*G06F 7/535* (2006.01)
*G06F 12/02* (2006.01)

(52) U.S. Cl.
CPC .......... *G06F 3/0619* (2013.01); *G06F 3/0629* (2013.01); *G06F 3/0679* (2013.01); *G06F 7/50* (2013.01); *G06F 7/535* (2013.01); *G06F 12/0246* (2013.01); *G06F 17/30227* (2013.01); *G06F 2207/535* (2013.01)

(58) Field of Classification Search
None
See application file for complete search history.

(56) References Cited

U.S. PATENT DOCUMENTS

| 9,542,431 | B2 * | 1/2017 | Prabhakaran | ..... G06F 17/30371 |
| 2005/0097266 | A1 * | 5/2005 | Factor | ................. G06F 11/1474 711/112 |
| 2005/0144362 | A1 * | 6/2005 | Lin | ..................... G11C 16/0416 711/103 |
| 2011/0055458 | A1 | 3/2011 | Kuehne | |
| 2012/0030408 | A1 * | 2/2012 | Flynn | .................. G06F 12/0246 711/102 |
| 2013/0166855 | A1 * | 6/2013 | Batwara | ................ G06F 3/0608 711/154 |

(Continued)

FOREIGN PATENT DOCUMENTS

| TW | 201243593 | 11/2012 |
| TW | 201633136 | 9/2016 |

*Primary Examiner* — Kaushikkumar Patel
(74) *Attorney, Agent, or Firm* — JCIPRNET

(57) ABSTRACT

A data writing method is provided. The method includes writing a first write data into a first physical sub-unit in a storage device according to a first write command; recording a first meta data corresponding to the first write data into the storage device; writing a second write data into a second physical sub-unit in the storage device; recording a second meta data corresponding to the second write data into the storage device. A second write identification code of the second meta data is set to be different from a first write identification code of the first meta data if the second physical unit is closely adjacent to the first physical unit and the second write data is written according to the second write command; and whether the second write data is valid or invalid is determined according to the second meta data if a special event occurs.

10 Claims, 12 Drawing Sheets

(56) References Cited

U.S. PATENT DOCUMENTS

| | | | |
|---|---|---|---|
| 2014/0143476 A1* | 5/2014 | Sela | G06F 3/0619 711/103 |
| 2014/0281145 A1* | 9/2014 | Tomlin | G06F 12/0246 711/103 |
| 2015/0074336 A1* | 3/2015 | Nemoto | G06F 3/0619 711/103 |
| 2016/0147859 A1* | 5/2016 | Lee | G06F 17/30371 707/615 |
| 2018/0067691 A1* | 3/2018 | Zhou | G06F 3/0619 |

* cited by examiner

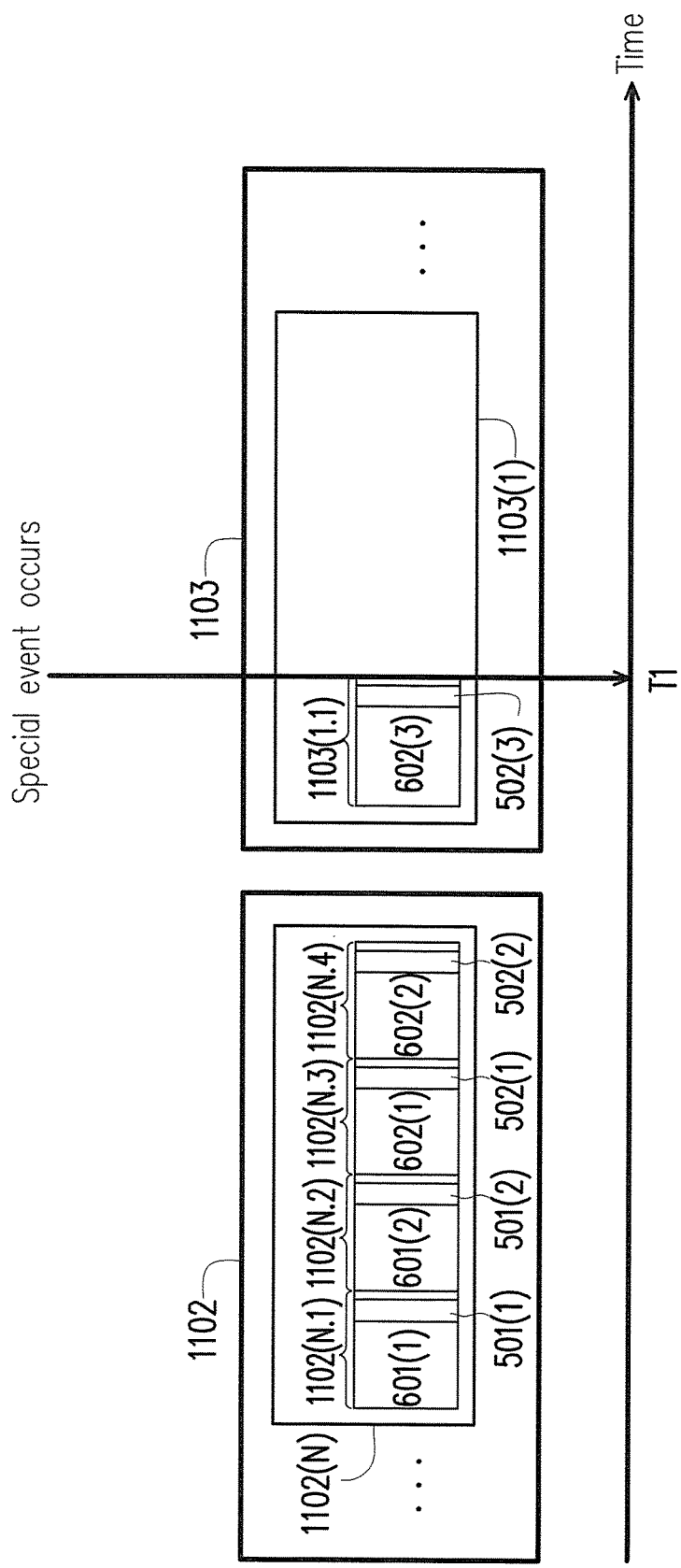

DATA WRITING METHOD AND STORAGE CONTROLLER

CROSS-REFERENCE TO RELATED APPLICATION

This application claims the priority benefit of Taiwan application serial no. 105137591, filed on Nov. 17, 2016. The entirety of the above-mentioned patent application is hereby incorporated by reference herein and made a part of this specification.

BACKGROUND

Technical Field

The invention relates to a data writing method, and more particularly, to a data writing method adapted to a storage device having a rewritable non-volatile memory module and a storage controller.

Description of Related Art

In general, atomic write commands may be used to achieve the effect of ensuring that write data corresponding to the atomic write commands can be completely programmed into a storage device.

However, in currently-known method for executing the atomic write commands, a recovery operation for sudden power-off events can achieve said effect of the atomic write commands through the support of a host application together with a unique command identification code sequence or a memory having a power recovery scheme. This will cause a large amount of consumption on both resource and time lead to reduction on working efficiency. Accordingly, finding a way to effectively execute the atomic write commands by consuming the least resource while correspondingly checking validity of the write data when facing the sudden power-off events to thereby determine whether the atomic write command is successfully executed has become one of research topics for persons skilled in the art.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention is directed to a data writing method and a storage controller, which are capable of efficiently executing atomic write commands and recording meta data corresponding to the atomic write commands, so whether write data corresponding to the atomic write commands is valid or invalid may be determined when a special event occurs.

An embodiment of the invention provides a data writing method, which is adapted to a storage device having the rewritable non-volatile memory module. The rewritable non-volatile memory module has a plurality of physical units, and each physical unit among the physical units has a plurality of physical sub-units. The method includes: writing a first write data into a first physical sub-unit in the rewritable non-volatile memory module according to a first write command; recording a first meta data corresponding to the first write data and writing the first meta data into the rewritable non-volatile memory module after writing the first write data, wherein the first meta data includes a first write identification code, a first write size and a first unit crossing flag, wherein the write identification code is either a first value or a second value, and the first value is different from the second value; writing a second write data into a second physical sub-unit in the rewritable non-volatile memory module; recording a second meta data corresponding to the second write data and writing the second meta data into the rewritable non-volatile memory module after writing the second write data, wherein the second meta data includes a second write identification code, a second write size and a second unit crossing flag, wherein the second write identification code of the second meta data is set to be different from the first write identification code of the first meta data if the second physical sub-unit is closely adjacent to the first physical sub-unit and the second write data is written according to a second write command different from the first write command, wherein the second write identification code of the second meta data is set to be identical to the first write identification code of the first meta data if the second write data is written according to the first write command; and determining whether the second write data is valid or invalid according to the second write data and the second meta data if a special event occurs.

An embodiment of the invention provides a storage controller, which is configured to control a storage device having a rewritable non-volatile memory module. The storage controller includes a connection interface circuit, a memory interface control circuit, a processor and a data management circuit. The connection interface circuit is configured to couple to a host system. The memory interface control circuit is configured to couple to the rewritable non-volatile memory module. The rewritable non-volatile memory module has a plurality of physical units, and each physical unit among the physical units has a plurality of physical sub-units. The processor is coupled to the connection interface circuit and the memory interface control circuit. The data management circuit is coupled to the processor, the connection interface circuit and the memory interface control circuit. The processor instructs the memory interface control circuit to write a second write data into a second physical sub-unit in the rewritable non-volatile memory module according to a first write command. Further, the data management circuit records a first meta data corresponding to the first write data and the processor instructs the memory interface control circuit to write the first meta data into the rewritable non-volatile memory module after writing the first write data. The first meta data includes a first write identification code, a first write size and a first unit crossing flag. The write identification code is either a first value or a second value, and the first value is different from the second value. Moreover, the processor instructs the memory interface control circuit to write a second write data into a second physical sub-unit in the rewritable non-volatile memory module. Further, the data management circuit records a second meta data corresponding to the second write data and the processor instructs the memory interface control circuit to write the second meta data into the rewritable non-volatile memory module after writing the second write data. The second meta data includes a second write identification code, a second write size and a second unit crossing flag. The data management circuit sets the second write identification code of the second meta data to be different from the first write identification code of the first meta data if the second physical sub-unit is closely adjacent to the first physical sub-unit and the second write data is written according to a second write command different from the first write command. The data management circuit sets the second write identification code of the second meta data to be identical to the first write identification code of the first meta data if the second write data is written according to the first write command. The processor determines whether the second write data is valid or invalid according to the second write data and the second meta data if a special event occurs.

Based on the above, the data writing method and the storage controller provided in the embodiments of the invention can write the meta data corresponding to the write data with specific settings may be written after writing the write data into the rewritable non-volatile memory module. As a result, when the special event occurs, whether the second write data is valid or invalid may be determined according to the write data and the meta data, so the data recovery operation may be performed correspondingly.

To make the above features and advantages of the invention more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5A is a schematic diagram illustrating an atomic write operation according to the first embodiment of the invention.

DESCRIPTION OF THE EMBODIMENTS

Figure 1:
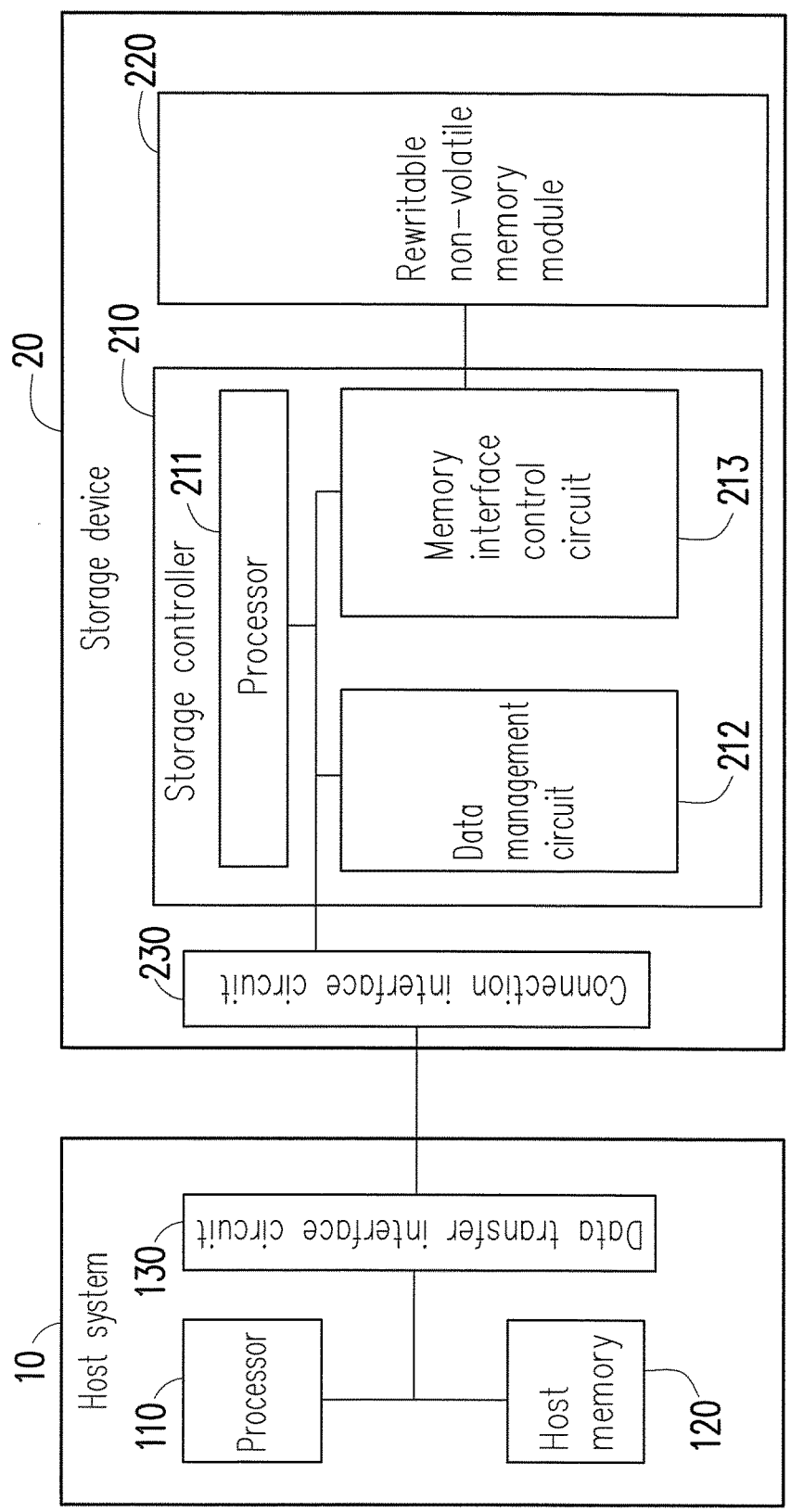
FIG. 1 is a block diagram illustrating a host system and a storage device according to an embodiment of the invention.

Reference will now be made in detail to the present preferred embodiments of the invention, examples of which are illustrated in the accompanying drawings. Wherever possible, the 3 same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In the present embodiment, a storage device includes a rewritable non-volatile memory module and a storage device controller (also known as a storage controller or a storage control circuit). Also, the storage device is usually used together with a host system so the host system can write data into or read data from the storage device.

FIG. 1 is a block diagram illustrating a host system and a storage device according to an embodiment of the invention.

Referring to FIG. 1, a host system 10 includes a processor 110, a host memory 120 and a data transfer interface circuit 130. In the present embodiment, the data transfer interface circuit 130 is coupled to (or, electrically connected to) the processor 110 and the host memory 120. In another embodiment, the processor 110, the host memory 120 and the data transfer interface circuit 130 are coupled to one another by utilizing a system bus.

A storage device 20 includes a storage controller 210, a rewritable non-volatile memory module 220 and a connection interface circuit 230. Among them, the storage controller 210 includes a processor 211, a data management circuit 212 and a memory interface control circuit 213.

In the present embodiment, the host system 10 is coupled to the storage device 20 through the data transfer interface circuit 130 and the connection interface circuit 230 of the storage device 20 to perform a data access operation. For example, the host system 10 can store data to the storage device 20 or read data from the storage device 20 through the data transfer interface circuit 130.

In the present embodiment, the processor 110, the host memory 120 and the data transfer interface circuit 130 may be disposed on a main board of the host system 10. The number of the data transfer interface circuit 130 may be one or more. Through the data transfer interface circuit 130, the main board may be coupled to the storage device 20 in a wired manner or a wireless manner. The storage device 20 may be, for example, a flash drive, a memory card, a solid state drive (SSD) or a wireless memory storage device. The wireless memory storage device may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board may also be coupled to various I/O devices including a GPS (Global Positioning System) module, a network interface card, a wireless transmission device, a keyboard, a monitor and a speaker through the system bus.

In the present embodiment, the data transfer interface circuit 130 and the connection interface circuit 230 are an interface circuit compatible with a Peripheral Component Interconnect Express (PCI Express) interface standard. Further, a data transfer is performed between the data transfer interface circuit 130 and the connection interface circuit 230 by using a communication protocol of a Non-Volatile Memory express (NVMe) interface standard.

Nevertheless, it should be understood that the invention is not limited thereto. The data transfer interface circuit 130 and the connection interface circuit 230 may also be compatible to a PATA (Parallel Advanced Technology Attachment) standard, an IEEE (Institute of Electrical and Electronic Engineers) 1394 standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC interface standard, a UFS (Universal Flash Storage) interface standard, an eMCP interface standard, a CF interface standard, an IDE (Integrated Device Electronics) interface standard or other suitable standards. Further, in another embodiment, the connection interface circuit 230 and the storage controller 210 may be packaged into one chip, or the connection interface circuit 230 is distributed outside a chip containing the storage controller 210.

In the present embodiment, the host memory 120 is configured to temporarily store commands executed by the processor 110 or data. For instance, in the present exemplary embodiment, the host memory 120 may be a Dynamic Random Access Memory (DRAM), or a Static Random Access Memory (SRAM) and the like. Nevertheless, it should be understood that the invention is not limited thereto, and the host memory 120 may also be other appropriate memories.

The storage unit 210 is configured to execute a plurality of logic gates or control commands, which are implemented in a hardware form or in a firmware form, and to perform operations of writing, reading or erasing data in the rewritable non-volatile memory storage module 220 according to the commands of the host system 10.

More specifically, the processor 211 in the storage controller 210 is a hardware with computing capabilities, which is configured to control overall operation of the storage controller 210. Specifically, the processor 211 has a plurality of control commands and the control commands are executed to perform various operations such as writing, reading and erasing data during operation of the storage device 20.

It is noted that, in the present embodiment, the processor 110 and the processor 211 are, for example, a central processing unit (CPU), a micro-processor, other programmable microprocessors, a digital signal processor (DSP), a programmable controller, an application specific integrated circuits (ASIC), a programmable logic device (PLD) or other similar circuit elements, which are not particularly limited by the invention.

In an embodiment, the storage controller 210 further includes a ROM (not illustrated) and a RAM (not illustrated). More particularly, the ROM has a boot code, which is executed by the processor 221 to load the control commands stored in the rewritable non-volatile memory module 220 into the RAM of the storage controller 210 when the storage controller 210 is enabled. Then, the control commands are executed by the processor 211 to perform operations, such as writing, reading or erasing data. In another embodiment, the control commands of the processor 211 may also be stored as program codes in a specific area (for example, physical storage units in the rewritable non-volatile memory module 220 dedicated for storing system data) of the rewritable non-volatile memory module 220.

In the present embodiment, as described above, the storage controller 210 further includes the data management circuit 212 and the memory interface control circuit 213. It should be noted that, operations performed by each part of the storage controller 220 may also be considered as operations performed by the storage controller 220.

The data management circuit 212 is coupled to the processor 211, the memory interface control circuit 213 and the connection interface circuit 230. The data management circuit 212 is configured to transmit data under instruction of the processor 211. For example, the data may be read from the host system 10 (e.g., the host memory 120) through the connection interface circuit 230, and the read data may be written into the rewritable non-volatile memory module 220 through the memory interface control circuit 213 (e.g., write operations performed according to write commands from the host system 10). As another example, the data may be read from the rewritable non-volatile memory module 220 through the memory interface control circuit 213, and the read data may be written into the host system 10 (e.g., the host memory 120) through the connection interface circuit 230 (e.g., read operations performed according to read commands from the host system 10). Further, in the present embodiment, the write operations may be divided into a normal write operation corresponding to a normal write command and an atomic write operation corresponding to an atomic write command. Namely, the write command includes two types of commands: the normal write command and the atomic write command. In another embodiment, the data management circuit 212 may also be integrated into the processor 211. Functions of the data management circuit 212 in the invention are described in more detail with reference to various drawings and embodiments.

The memory interface control circuit 213 is configured to perform write (or, programming) operation, read operation and erase operation for the rewritable non-volatile memory module 220 together with the data management circuit 212 under instruction of the processor 211.

For instance, the processor 211 can execute a write command sequence (e.g., a normal write command sequence or an atomic write command sequence) so as to instruct the memory interface control circuit 213 to write the data into the rewritable non-volatile memory module 220; the processor 211 can execute a read command sequence to instruct the memory interface control circuit 213 so as to read the data from the rewritable non-volatile memory module 220; the processor 211 can execute an erase command sequence to instruct the memory interface control circuit 213 so as to perform the erasing operation for the rewritable non-volatile memory module 220. Each of the write command sequence, the read command sequence and the erase command sequence may include one or more program codes or command codes, which are configured to perform the corresponding operations of writing, reading and erasing for the rewritable non-volatile memory module 220. In an embodiment, the processor 211 can further give other command sequences to the memory interface control circuit 213 so as to perform the corresponding operations for the rewritable non-volatile memory module 220.

In addition, data to be written to the rewritable non-volatile memory module 220 is converted into a format acceptable by the rewritable non-volatile memory module 220 through the memory interface control circuit 213. Specifically, when the processor 211 intends to access the rewritable non-volatile memory module 220, the processor 211 sends the corresponding command sequences to the memory interface control circuit 213 in order to instruct the memory interface control circuit 213 to perform the corresponding operations. For example, the command sequences may include the write command sequence which instructs to write data, the read command sequence which instructs to read data, the erase command sequence which instructs to erase data, and other corresponding command sequences for instructing to perform various memory operations (e.g., changing read voltage levels or performing a garbage collection procedure). The command sequences may include one or more signals, or data from the bus. The signals or the data may include command codes and program codes. For example, information such as identification codes and memory addresses are included in the read command sequence.

The rewritable non-volatile memory module 220 is coupled to the storage controller 210 (the memory control circuit unit 213) and configured to store data written from the host system 10. The rewritable non-volatile memory module 220 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features. The memory cells in the rewritable non-volatile memory module 220 are disposed in an array.

In the present embodiment, the memory cells of the rewritable non-volatile memory module 220 can constitute a plurality of physical programming units (also known as physical sub-units), and the physical programming units can constitute a plurality of physical blocks (also known as physical erasing units or physical units). Specifically, the memory cells on the same word line (or the same word line layer) can constitute one or more of the physical programming units. If each of the memory cells may be used to store two or more bits, the physical programming units on the same word line (or the same word line layer) may be at least classified into one lower physical programming unit and one upper physical programming unit.

In the present embodiment, the physical sub-unit is used as a minimum unit for writing (programming) data. The physical unit is a minimum unit for erasing (i.e., each physical unit includes a minimum number of memory cells to be erased together). Each physical unit includes multiple physical sub-units. The physical sub-unit may be a physical page or a physical sector. In the present embodiment, the physical sub-unit includes a data bit area and a redundancy bit area. The data bit area is configured to store the user data, and the redundant bit area is configured to store the system data. The system data may be, for example, an error correcting code, an error detection code or a meta data. The meta data will be described in more details later. However, the invention is not limited to the above. For example, in another embodiment, the data write method described in the present embodiment may also be modified and applied to the rewritable non-volatile memory module 220 which uses the physical unit as a minimum storage unit for writing data.

In the following embodiments, examples in which one physical block serves as one physical unit are provided. However, in another embodiment, one physical unit may also refer to a combination of any number of memory cells, depending on practical requirements. Further, it should be understood that, when the storage controller 211 groups the memory cells (or the physical units) in the rewritable non-volatile memory module 220 for the corresponding management operations, the memory cells (or the physical units) are logically grouped but their actual locations are not changed.

The storage controller 210 assigns a plurality of logical units to the rewritable non-volatile memory module 220. The host system 10 accesses the user data stored in multiple physical units by the assigned logical units. Herein, each of the logical units may be constituted by one or more logic addresses. For example, the logical unit may be a logical block, a logical page or a logical sector. One logical unit may be mapped to one or more physical units, where the physical unit may be one or more physical addresses, one or more physical sectors, one or more physical programming units, or one or more physical erasing units. In the present embodiment, the logical unit refers to the logical block and a logical sub-unit refers to the logical page. Each logical unit has multiple logical sub-units.

For instance, the storage controller 210 creates a logical to physical address mapping table and a physical to logical address mapping table for recording a mapping relation between the logical units (e.g., the logical blocks, the logical pages or the logical sectors) assigned to the rewritable non-volatile memory module 220 and the physical units (e.g., the physical erasing units, the physical programming units or the physical sectors). In other words, the storage controller 210 can look up for the physical unit mapped to one logical unit by using the logical to physical address mapping table, and the storage controller 210 can look up for the logical unit mapped to one physical unit by using the physical to logical address mapping table. Nonetheless, the technical concept for the mapping relation between the logical units and the physical units is a well-known technical means in the field, which is not repeated hereinafter.

In an embodiment, the storage controller 210 further includes a buffer memory and a power management circuit. The buffer memory is coupled to the processor 211 and configured to temporarily store data and commands from the host system 10, data from the rewritable non-volatile memory module 220 or other system data for managing the storage device 20. The power management circuit is coupled to the processor 211 and configured to control power of the storage device 20.

As described above, in the present embodiment, the write commands may be divided into the normal write command and the atomic write command. The normal write command is configured to instruct writing data into one logical sub-unit. The storage controller 210 performs the normal write operation according to the normal write command to program data into one physical sub-unit. Next, in the present embodiment, in response to the data being programmed into the physical sub-unit, the storage controller 210 stores the meta data corresponding to the normal write command to record whether the data is programmed into the physical sub-unit. And then, the storage controller 210 updates the logical to physical address mapping table and the physical to logical address mapping table, or updates a logical to physical address sub mapping table or a physical to logical address sub mapping table, so as to record a mapping relation between logical addresses and physical addresses for storing the data. Only after that, the normal write operation can be considered as being completed.

Figure 2:
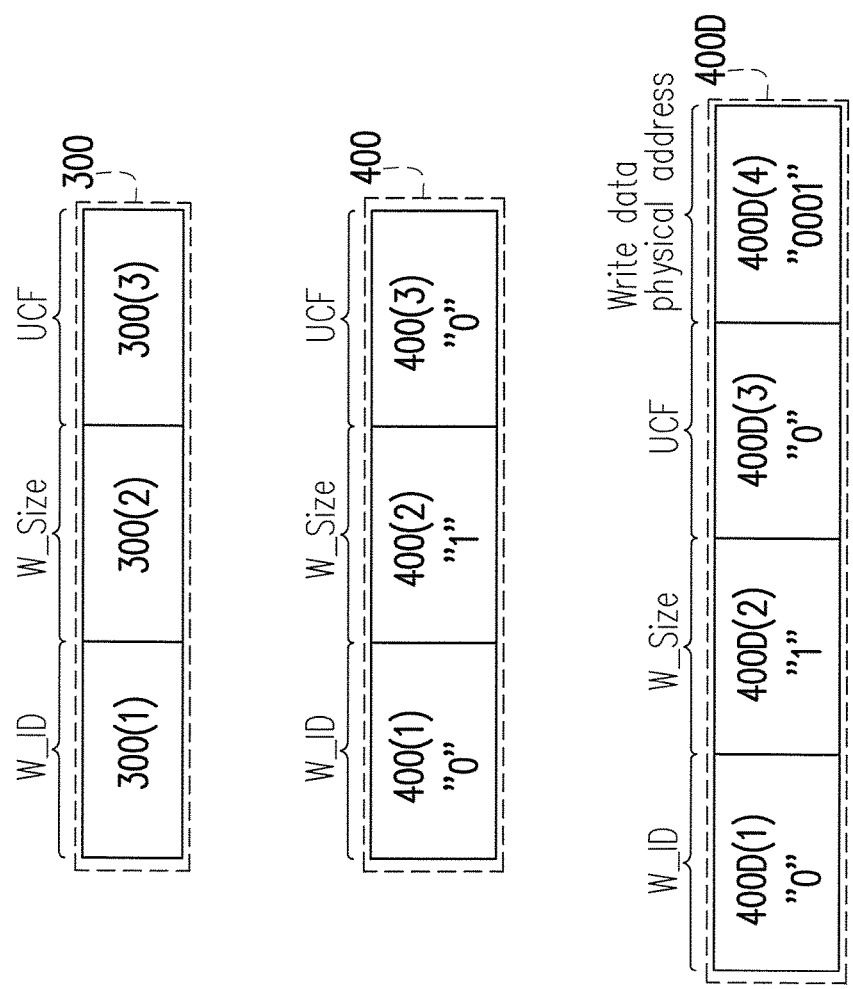
FIG. 2 is a schematic diagram illustrating a data structure of a meta data according to an embodiment of the invention.

FIG. 2 is a schematic diagram illustrating a data structure of a meta data according to an embodiment of the invention. Referring to FIG. 2, in the present embodiment, a data structure of a meta data 300 includes three fields 300(1), 300(2) and 300(3), where the field 300(1) records a write identification code (Write ID; W_ID); the field 300(2) records a write size (W_Size); the field 300(3) records a unit crossing flag (UCF). If the physical unit is the physical block, the unit crossing flag may also be referred to as a block crossing flag (BCF).

In the present embodiment, contents recorded by the meta data corresponding to the normal write command are simpler compared to those in the meta data corresponding to the atomic write command. Specifically, a value of a write command 400(2) of a meta data 400 corresponding to the normal write command is constantly recorded as "1". Further, values of a write identification code 400(1) or a unit crossing flag 400(3) of the meta data 400 corresponding to the normal write command are specific values or specific characters being pre-recorded. For example, in the present embodiment, the write identification code 400(1) and the unit crossing flag 400(3) of the meta data 400 corresponding to the normal write command are both recorded as "0". An another example, in another embodiment, it is also possible that the write identification code or the unit crossing flag of the meta data corresponding to the normal write command are not recorded with any value.

On the other hand, in the present embodiment, a value of each field of the meta data corresponding to the atomic write command is recorded according to a specific rule. A recording method of the meta data corresponding to the atomic write command, a corresponding data (atomic) writing method and a corresponding data recovery operation in the invention will be described in more details below with reference to drawings and embodiments.

Figure 3:
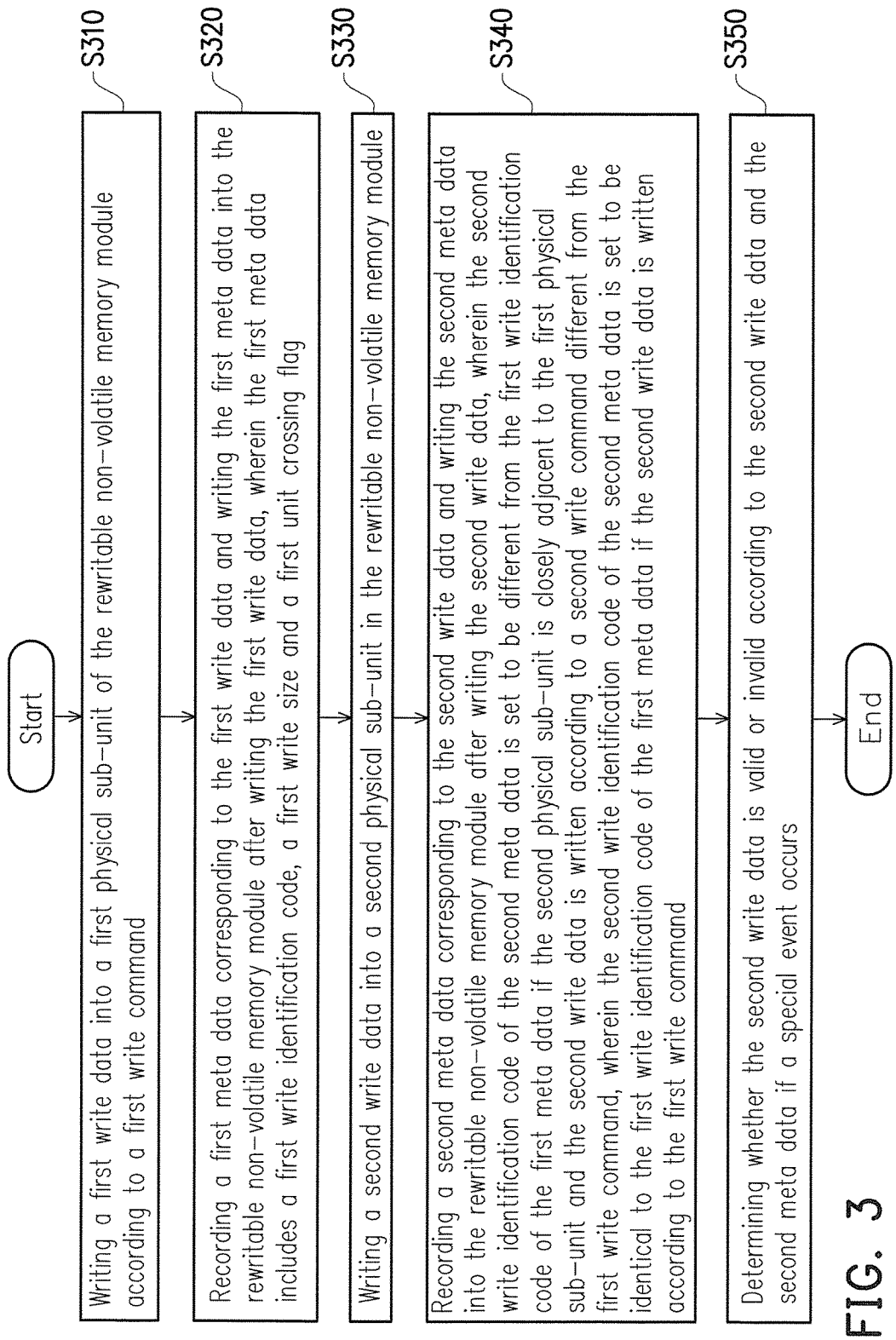
FIG. 3 is a flowchart illustrating a data writing method according to an embodiment of the invention.

FIG. 3 is a flowchart illustrating a data writing method according to an embodiment of the invention. Referring to FIG. 3, in step S310, the processor 211 instructs the memory interface control circuit 213 to write a first write data into a first physical sub-unit in the rewritable non-volatile memory module according to a first write command. Specifically, the host system 10 gives a plurality of read commands or write commands to the storage controller 210 of the storage device 20 in order to access the data in the storage device 20. After receiving (or reading) the read/write commands given by the host system 10, the storage controller 210 perform is the data reading/writing operation for the rewritable non-volatile memory module 220 in the storage device 20.

For instance, in an embodiment, it is assumed that the processor 110 of the host system 10 divides the host memory 120 into a temporary data area and a command queue area, and the storage controller 210 further includes a command management unit. The command management unit is, for example, a circuit element having a command buffer, a command status register and a command fetching circuit. The host system 10 stores the read commands or the write commands to the command queue area of the host memory 120, and the command fetching circuit reads the read/write commands from the command queue area and stores the read commands to the command buffer. The processor 211 may select the command to be processed according to a firmware or software predetermined rule. Next, the processor 211 executes the selected command, and instructs the memory interface control circuit 213 to perform the corresponding data transfer operation for the rewritable non-volatile memory module 220 according to the selected command (e.g., an NVMe I/O command).

In the present embodiment, the first write command is an atomic write command (also known as a first atomic write command), and the atomic write command instructs (through an atomic write operation) to write the first write data into a first logical sub-unit. When the processor 211 is executing the first write command, the processor 211 selects one writable physical unit from multiple physical units in the rewritable non-volatile memory module 220 to serve as an open physical unit, and programs the first write data into the physical sub-units of open physical unit. The atomic write operation can be considered as being completed only when all the write data to be stored as instructed by the atomic write command are stored (written/programmed). In other words, if one atomic write command instructs to write two write data and yet one of the write data cannot be stored (written/programmed) into the rewritable non-volatile memory module (or the process of programming one of the write data is unsuccessful), the atomic write operation corresponding to the atomic write command is considered as unsuccessful. In this case, the other write data which has been stored (written/programmed) into the rewritable non-volatile memory module 220 is also determined (marked) as invalid.

In other words, one atomic write operation can be considered as being successfully completed only when all the write data corresponding to the atomic write operation are successfully programmed into the rewritable non-volatile memory module 220. Next, the processor 211 determines whether to perform the atomic write operation corresponding to the atomic write command again or not according to whether a logical unit, as instructed by the atomic write command, has been written into a valid data before.

In step S320, the data management circuit 212 records a first meta data corresponding to the first write data and writes the first meta data into the rewritable non-volatile memory module after writing the first write data. The first meta data includes a first write identification code, a first write size and a first unit crossing flag. First, as illustrated in FIG. 2, the meta data 300 corresponding to the first write command has the following fields: the write identification code 300(1), the write size 300(2) and the unit crossing flag 300(3). It should be noted that, a sequential order of said three fields are not limited by the example in FIG. 2, and the sequential order may be changed according to vendor settings.

In response to the first write data being written into the first physical sub-unit, the data management circuit sets (records) the first meta data corresponding to written first write data. After the first meta data is set, the processor 211 instructs the memory interface control circuit to store (write) the first meta data into the rewritable non-volatile memory module 220. The method of storing the meta data in the invention is described below with reference to FIGS. 4A to 4D.

Figure 4A:
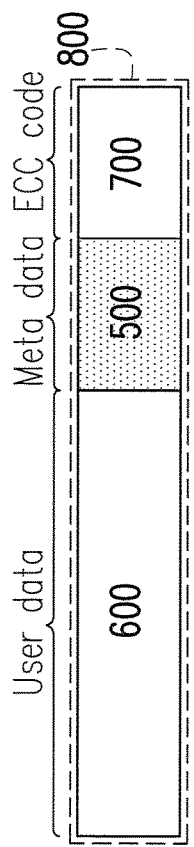
FIG. 4A illustrates a schematic diagram for storing the meta data according to an embodiment of the invention.
Figure 4B:
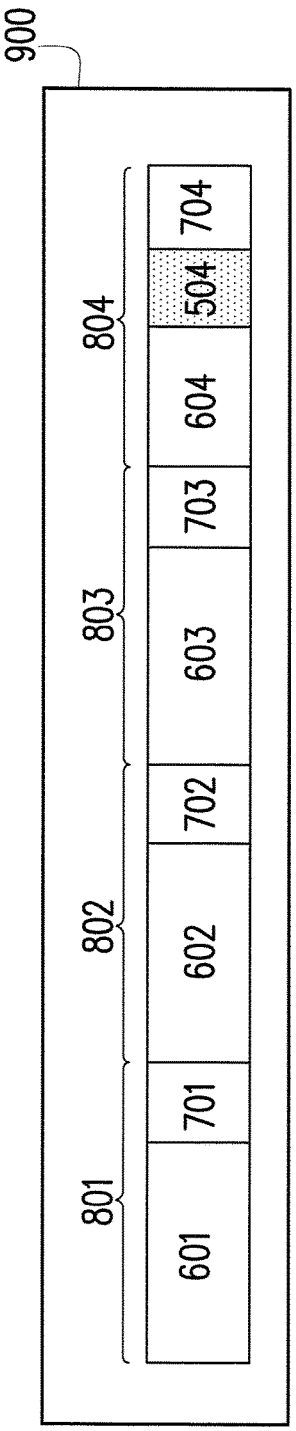
FIG. 4B illustrates a schematic diagram for storing the meta data according to another embodiment of the invention.
Figure 4C:
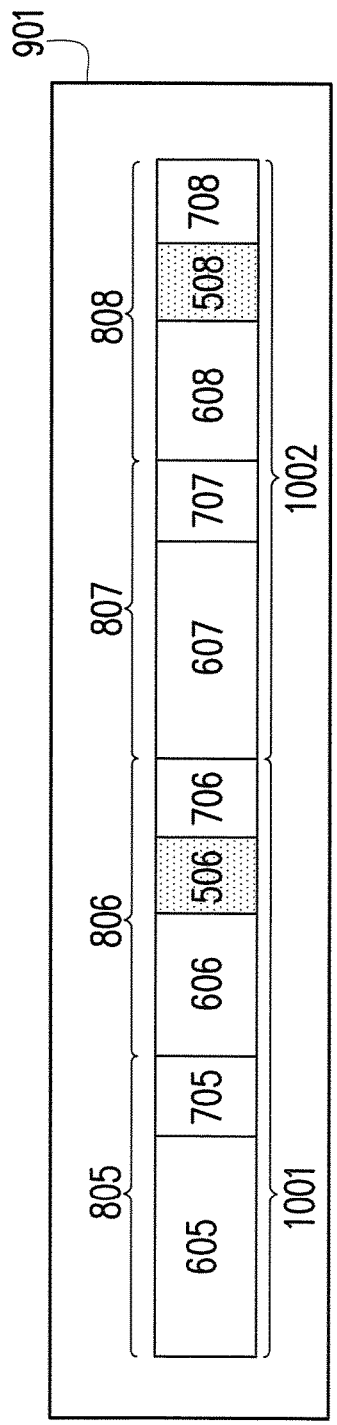
FIG. 4C illustrates a schematic diagram for storing the meta data according to another embodiment of the invention.
Figure 4D:
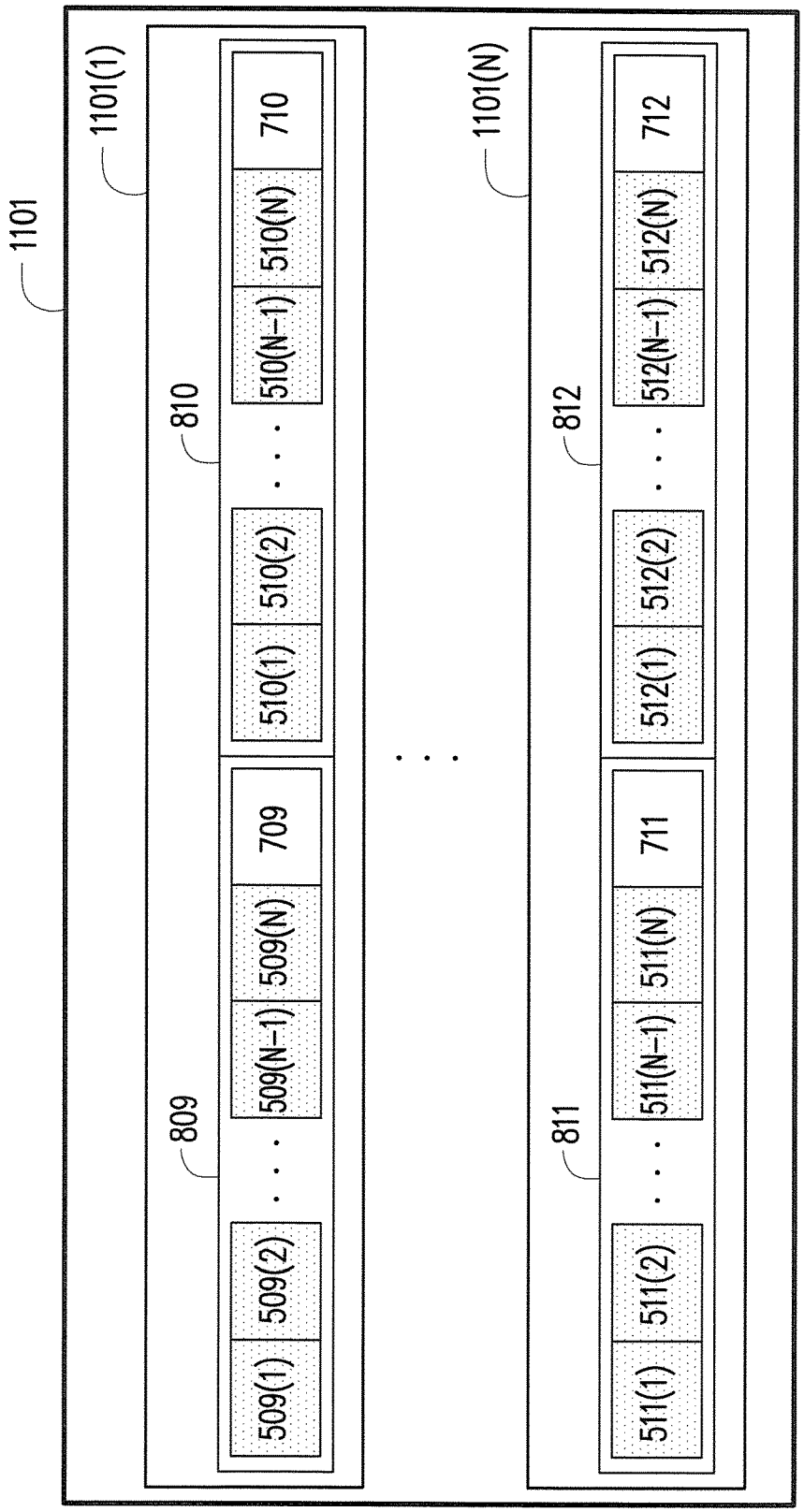
FIG. 4D illustrates a schematic diagram for storing the meta data according to another embodiment of the invention.

FIG. 4A illustrates a schematic diagram for storing the meta data according to an embodiment of the invention. FIG. 4B illustrates a schematic diagram for storing the meta data according to another embodiment of the invention. FIG. 4C illustrates a schematic diagram for storing the meta data according to another embodiment of the invention. FIG. 4D illustrates a schematic diagram for storing the meta data according to another embodiment of the invention.

First, referring to FIG. 4A, in the example of FIG. 4A, a meta data 500 is stored in each error checking and correcting unit (also known as an error checking and correction codeword; ECC codeword). For instance, the error checking and correcting unit 800 (ECC unit 800) includes a user data 600, the meta data 500 and an error checking and correcting code 700. Among them, the error checking and correcting code 700 may be used to check and correct the user data 600 and the meta data 500. In other words, besides the user data 600, the meta data 500 is also under protection of the error checking and correcting code 700. A method of generating the error checking and correcting code is not within the scope of the invention, and thus description regarding the same is omitted. It should be noted that, the user data 600 may also be regarded as aforesaid first write data, and the meta data 500 may also be regarded as the meta data corresponding to the first write data. In this example, the error checking and correcting unit 800 may be regarded as the physical sub-unit.

Referring to FIG. 4B, in the example of FIG. 4B, a meta data 504 is stored in a last error checking and correcting unit 804 in one physical page 900. For instance, the error checking and correcting unit 804 includes a user data 604, the meta data 504 and an error checking and correcting code 704 (the error checking and correcting unit 801 includes a user data 601 and an error checking and correcting code 701; the error checking and correcting unit 802 includes a user data 602 and an error checking and correcting code 702; the error checking and correcting unit 803 includes a user data 603 and an error checking and correcting code 703). In this example, the physical page may be regarded as the physical sub-unit.

Referring to FIG. 4C, in the example of FIG. 4C, the meta data is stored in each access unit. The access unit is also known as a pseudo access unit. For instance, a physical sub-unit 901 includes an access unit 1001 and an access unit 1002. Each access unit has two error checking and correcting units. A meta data 506 is stored in an error checking and correcting unit 806 of the access unit 1001, and a meta data 508 is stored in an error checking and correcting unit 808 of the access unit 1002 (the error checking and correcting unit 805 includes a user data 605 and an error checking and correcting code 705; the error checking and correcting unit 806 further includes a user data 606 and an error checking and correcting code 706; the error checking and correcting unit 807 includes a user data 607 and an error checking and correcting code 707; the error checking and correcting unit 808 further includes a user data 608 and an error checking and correcting code 708). In this example, the access unit may be regarded as the physical sub-unit. It should be noted that, the manufacturer can customize a size of the access unit or a number of the error checking and correcting units included by the access unit.

In the above-described examples, the meta data is stored in the physical sub-unit, the physical unit, the access unit or the error checking and correcting unit, which are configured to store the corresponding write data. However, the meta data does not have to be stored in the physical sub-unit configured to store the write data corresponding to the meta data.

For example, the processor 211 may also select one specific physical unit (e.g., the physical block) to store all the meta data. Referring to FIG. 4D, it is assumed that a physical block 1101 is specially configured to store the meta data, the physical block 1101 has N physical pages 1101(1) to 1101(N), and each access unit of each physical page can store N meta data. For example, an access unit 809 of the physical page 1101(1) stores meta data 509(1) to 509(N) (an access unit 810 of the physical page 1101(1) stores meta data 510(1) to 510(N); an access unit 811 of the physical page 1101(N) stores meta data 511(1) to 511(N); an access unit 812 of the physical page 1101(N) stores meta data 512(1) to 512(N)). In addition, each access unit has an error checking and correcting code for protecting the stored meta data. For example, the meta data 509(1) to 509(N) stored in the access unit 809 are protected by an error checking and correcting code 709 (the meta data 510(1) to 510(N) stored in the access unit 810 are protected by an error checking and correcting code 710; the meta data 511(1) to 511(N) stored in the access unit 811 are protected by an error checking and correcting code 711; the meta data 512(1) to 512(N) stored in the access unit 812 are protected by an error checking and correcting code 712). It is noted that, in the example of FIG. 4D, because the meta data is not stored into the physical sub-unit, the physical unit, the access unit or the error checking and correcting unit together with the corresponding write data, the meta data in FIG. 4D further includes an additional field for recording the physical address of the write data corresponding to the meta data. For example, as illustrated in FIG. 2, a meta data 400D represents a data structure of the meta data in the example of FIG. 4D. The meta data 400D stores not only a write identification code 400D(1), a write size 400D(2) and a unit crossing flag 400D(3) but also a write data physical address 400D(4) ("0001", which denotes a value of the physical address of the write data). Accordingly, the processor 211 can then identify the address of the physical sub-unit currently stored with the write data corresponding to the meta data 400D.

Referring back to FIG. 3, in step S330, the processor 211 instructs the memory interface control circuit 213 to write a second write data into a second physical sub-unit in the rewritable non-volatile memory module 220. In step S340, the data management circuit 212 records a second meta data corresponding to the second write data and the processor 211 instructs the memory interface control circuit 213 to write the second meta data into the rewritable non-volatile memory module 220 after writing the second write data, wherein the data management circuit 212 sets the second write identification code of the second meta data to be different from the first write identification code of the first meta data if the second physical sub-unit is closely adjacent to the first physical sub-unit and the second write data is written according to a second write command different from the first write command, wherein the data management circuit 212 sets the second write identification code of the second meta data to be identical to the first write identification code of the first meta data if the second write data is written according to the first write command.

Specifically, the method of setting the meta data corresponding to the atomic write command provided in the embodiments of the invention is characterized in that, the present embodiment can differentiate the meta data corresponding to the different atomic write commands simply by using the write identification code with the size of one bit and determine whether the write data already written in correspondence to the atomic write command is valid or invalid (or determine whether the atomic write operation is successful) in a manner of consuming the least resource, so as to effectively determine whether to perform the data recovery operation correspondingly. The method of recording the meta data corresponding to the atomic write command is described below with reference to the first embodiment.

FIRST EMBODIMENT

Figure 5B:
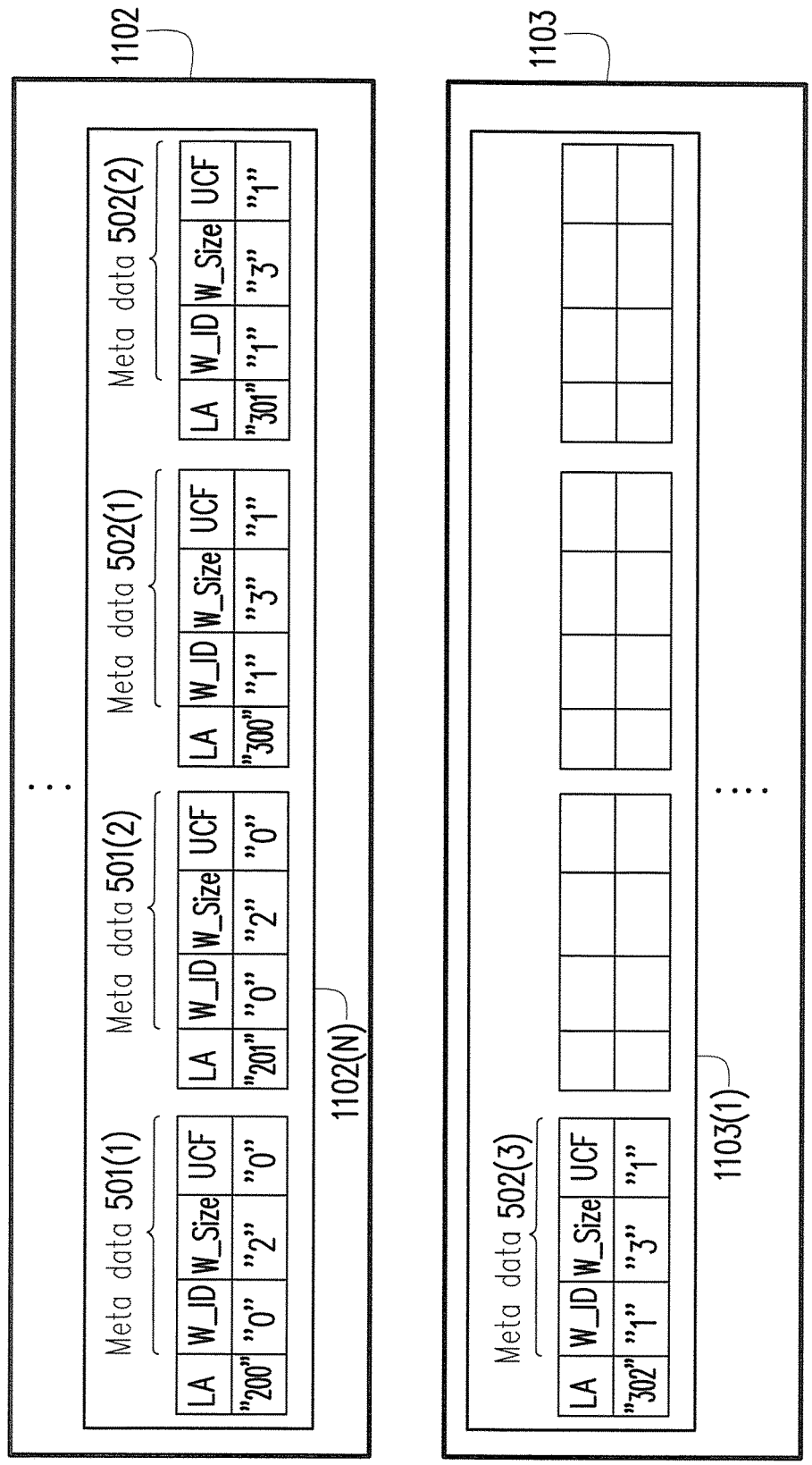
FIG. 5B is a schematic diagram illustrating a meta data corresponding to the atomic write operation illustrated in FIG. 5A according to the first embodiment of the invention.

FIG. 5A is a schematic diagram illustrating an atomic write operation according to the first embodiment of the invention. FIG. 5B is a schematic diagram illustrating a meta data corresponding to the atomic write operation illustrated in FIG. 5A according to the first embodiment of the invention.

Referring to FIG. 5A, for descriptive convenience, it is assumed that each physical block has N physical pages, each physical page has four access units, each access unit (also known as the physical sub-unit) has one error checking and correcting unit, and the write data (the user data) and the meta data corresponding to the write data are stored together into one access unit (which is similar to the example of FIG. 4C but each access unit only includes one error checking and correcting unit).

For instance, with the passage of time, according to the first atomic write command, the processor 211 instructs the memory interface control circuit 213 to write two write data 601(1) and 601(2) into physical sub-units 1102(N.1) and 1102(N.2) of a last physical page 1102(N) of a physical block (also known as the physical unit) 1102, respectively. Further, according to a second atomic write command, the processor 211 instructs the memory interface control circuit 213 to write two write data 602(1) and 602(2) into physical sub-units 1102(N.3) and 1102(N.4) of the last physical page 1102(N) of the physical block 1102, respectively, and then write one write data 602(3) into a physical sub-unit 1103 (1.1) of a first physical page 1103(1) of a physical block 1103 (i.e., the second atomic write command is configured to instruct writing three write data). A connection relation between the physical sub-units may be defined according to a precedence relation of the physical addresses. For example, the physical sub-unit 1102(N.1) is closely adjacent before the physical sub-unit 1102(N.2) and the physical sub-unit 1102(N.3) is closely adjacent behind the physical sub-unit 1102(N.2). Further, a physical sub-unit 1102(N.4) is closely adjacent before the physical sub-unit 1103(1.1). It should be noted that, the physical block 1102 is closely adjacent before the physical block 1103. A physical block identification code of the physical block 1102 is different from a physical block identification code of the physical block 1103.

Referring to FIG. 5B, for descriptive convenience, a logical address (e.g., the logical sub-unit for storing the write data) of the write data corresponding to the meta data is marked under a filed LA at the front of the meta data. For example, "200" as recorded under LA at the front of a meta data 501(1) means that the write data 601(1) of the meta data 501(1) is stored in a logical address (LA) "200" (logical sub-unit "200"). In other words, after the write data 601(1) is written into the physical sub-unit 1102(N.1), the meta data 501(1) is written into the physical sub-unit 1102(N.1). That is, the meta data 501(1) corresponds to the physical sub-unit 1102(N.1) or the write data 601(1). By analogy, a meta data 501(2) corresponds to the physical sub-unit 1102(N.2) or the write data 601(2); a meta data 502(1) corresponds to the physical sub-unit 1102(N.3) or the write data 602(1); a meta data 502(2) corresponds to the physical sub-unit 1102(N.4) or the write data 602(2); a meta data 502(3) corresponds to the physical sub-unit 1103(1.1) or the write data 602(3).

In addition, the physical pages and the meta data in the physical sub-units are arranged according to an order of the physical sub-units, as illustrated in FIG. 5B. For example, the physical sub-unit 1102(N.1) is closely adjacent before the physical sub-unit 1102(N.2) and the physical sub-unit 1102(N.3) is closely adjacent behind the physical sub-unit 1102(N.2). Therefore, the meta data 501(1) corresponding to the physical sub-unit 1102(N.1) or the write data 601(1) is arranged before the meta data 501(2), and the meta data 502(1) corresponding to the physical sub-unit 1102(N.3) or the write data 602(1) is arranged behind the meta data 501(2).

With regard to the write identification code of the meta data, the write identification codes of the meta data corresponding to the same atomic write command are identical in the present embodiment. For example, the first atomic write command is configured to instruct writing the write data 601(1) into a logical sub-unit 200 and writing the write data 601(2) into a logical sub-unit 201. Therefore, the write identification codes W_ID of the meta data 501(1) and 501(2) corresponding to the first atomic write command are identical (e.g., the write identification code W_ID of the meta data 501(1) and the write identification code W_ID of the meta data 501(2) are both "0").

Further, the write data 602(1)/the physical sub-unit 1102 (N.3) of the second atomic write command is closely adjacent to the write data 601(2)/the physical sub-unit 1102(N.2) of the first atomic write command. Therefore, when the write identification codes of the meta data 502(1), 502(2) and 502(3) corresponding to the second atomic write command are to be set, the data management circuit 212 sets the write identification codes of the meta data 502(1), 502(2) and 502(3) to be different from the write identification codes of the meta data 501(1) and 501(2) corresponding to the first atomic write command. Accordingly, whether the atomic write command corresponding to the meta data is changed may be determined by sequentially checking whether the write identification codes of the meta data are changed.

For instance, assuming that the checking starts from the meta data 501(1) to the meta data 502(2), since the write identification codes of the two closely adjacent meta data 501(2) and 502(1) are different, it can be determined that the two closely adjacent meta data 501(2) and 502(1) belong to the different atomic write commands. On the other hand, if the write identification codes of the two closely adjacent meta data 501(1) and 501(2) are identical, it can be determined that the two closely adjacent meta data 501(1) and 501(2) belong to the same atomic write command.

In other words, in the present embodiment, a distribution status (e.g., whether the write data corresponding to the meta data arranged before (behind) the meta data currently under checking and the write data corresponding to the meta data currently under checking belong to the same write command) of the meta data (or the corresponding write data)

may be clearly identified simply by using, for example, the space with the size of one bit to record the write identification codes. The write identification code may include either "0" or "1" (i.e., the write identification code may be regarded as recording either a first value or a second value). Accordingly, the meta data belonging to the different write commands may be identified by consuming the least resource.

When the distribution status of the multiple meta data belonging to the same atomic write command can be determined, whether the write data to be written by the atomic write command are written into the rewritable non-volatile memory module 220 may then be checked accordingly, so as to determine whether the atomic write operation performed according to the atomic write command is successful.

More specifically, when the distribution status of multiple meta data belonging to the same atomic write command can be identified, a quantity of multiple meta data belonging to the same atomic write command may be used to compare with the write sizes (W_Size) in multiple meta data, so as to confirm whether all the write data of one atomic write command are written into the rewritable non-volatile memory module 220. The method of setting (recording/calculating) the write size is described as follows.

In the present embodiment, the data management circuit 212 calculates the write size (W_Size) of the meta data according to the corresponding atomic write command and a preset access unit size. Specifically, assuming that the first write command is configured to instruct writing the first write data and the second write data into a first logical sub-unit and a second logical sub-unit respectively, the data management circuit 212 sums up sizes of the first logical sub-unit and the second logical sub-unit and then divides a sum of the sizes of the first logical sub-unit and the second logical sub-unit by the preset access unit size (e.g., a size of the physical sub-units) to obtain a quotient value. And then, a value obtained by rounding up the quotient value to integer is used as the first write size of the first meta data corresponding to the first atomic write command. In other words, the data management circuit 212 calculates the sum of the size of the write data and then calculates how many access units are required for storing all the write data. The calculated number of the access units required is the write size, and each of the access units stored with the write data also stores one meta data.

For instance, referring to FIG. 5A and FIG. 5B, it is assumed herein that the first write command is configured to instruct writing the first write data 601(1) and the second write data 601(2) into a first logical sub-unit "200" and a second logical sub-unit "201" respectively, and each of the access units (the physical sub-units) stores one meta data. A size of each logical sub-unit is 512 bytes, and the preset access unit size (i.e., the size of the physical sub-units) is also 512 bytes.

In this example, the data management circuit 212 sums up the sizes of the first logical sub-unit "200" and the second logical sub-unit "201" to be 1024 bytes. Next, the quotient value obtained by dividing the sum of the sizes of the first logical sub-unit and the second logical sub-unit by the preset access unit size is calculated by the data management circuit to be "2". And then, as shown by FIG. 5B, the data management circuit 212 sets the write sizes (W_Size) of the meta data 501(1) and 501(2) corresponding to the first atomic write command to be "2". By analogy, the write sizes of the meta data 502(1), 502(2) and 502(3) corresponding to the second atomic write command are set to be "3" (i.e., (512*3)/512=3).

In the present embodiment, as described above, the write data 602(1), 602(2) and 602(3) of the second atomic write command are written into the physical sub-units 1102(N.3), 1102(N.4) and 1103(1.1) respectively. Among them, the physical sub-units 1102(N.3) and 1103(1.1) closely adjacent to each other belong to the physical blocks having the different physical block identification codes. All the write data of the second atomic write command may be regarded as being stored across the physical blocks having the different physical block identification codes. In this case, the data management circuit 212 sets the unit crossing flag UCF (also known as the block crossing flag BCF) of each of the meta data 502(1), 502(2) and 502(3) corresponding to the second atomic write command to be "1" (also known as a third value). Conversely, because none of the write data of the first atomic write command are stored across the physical blocks having the different physical block identification codes, the data management circuit 212 sets the unit crossing flag UCF of each of the meta data 501(1) and 501(2) corresponding to the first atomic write command to be "0" (also known as a fourth value).

In view of the examples above, it can be noted that the meta data corresponding to the same atomic write command are identical to one another.

The method of setting the meta data corresponding to the atomic write command is described as the above. Referring back to FIG. 3, in step S350, the processor 211 determines whether the second write data is valid or invalid according to the second write data and the second meta data if a special event occurs.

Specifically, the special event may be, for example, an abnormal power-off event or a sudden power-off event. For example, referring to FIG. 5A, it is assumed that the special event occurs at a time point T1. That is, after the write data 602(3) and the corresponding meta data 502(3) are both written into the physical sub-unit 1103(1.1), the special event (e.g., sudden power-off) suddenly takes place in the storage device 20 at the time point T1.

In the case where the special event is the sudden power-off event, in this case the processor 211 is able to determine that the previous power-off belongs to the sudden power-off event after the power is restored. Next, the processor 211 determines whether the last write data being written is valid or invalid or determines whether the last executed atomic write command is successful, so as to perform a sudden power-off recovery (SPOR) operation (also known as the data recovery operation) correspondingly. The operations for determining whether the last write data being written is valid or invalid or determining whether the last atomic write command being executed is successful are described as follows. In the present embodiment, the processor 211 identifies a last physical sub-unit of the physical sub-units stored with data in an open physical block (also known as the open physical unit). Next, the processor 211 identifies the meta data of the last physical sub-unit stored with data. The open physical block is a physical block stored with data and to which data can still be further written. The open physical block is the last physical block to be written with data. Next, the processor 211 determines whether the open physical block includes at least one other physical sub-unit, which stores the write data/the meta data belonging to the same atomic write command as the write data/the meta data stored by the last physical sub-unit. And then, the processor 211 compares whether a quantity of all the meta data of the atomic write command corresponding to the last physical sub-unit stored with data is equal to the value of the write size in the meta data, so as to determine whether the last write data being written is valid or invalid (determine whether the last executed atomic write command is successful). If they are equal, the processor 211 determines that the write data corresponding to the atomic write command is valid or it means that the atomic write operation corresponding to the atomic write command is successful. If they are not equal, the processor 211 determines that the write data corresponding to the atomic write command is invalid or it means that the atomic write operation corresponding to the atomic write command is unsuccessful. In such case, the processor 211 marks the write data as invalid or marks that the atomic write command is unsuccessfully executed.

The data recovery operation of the invention is described with reference to the second to the fourth embodiments.

SECOND EMBODIMENT

Figure 6A:
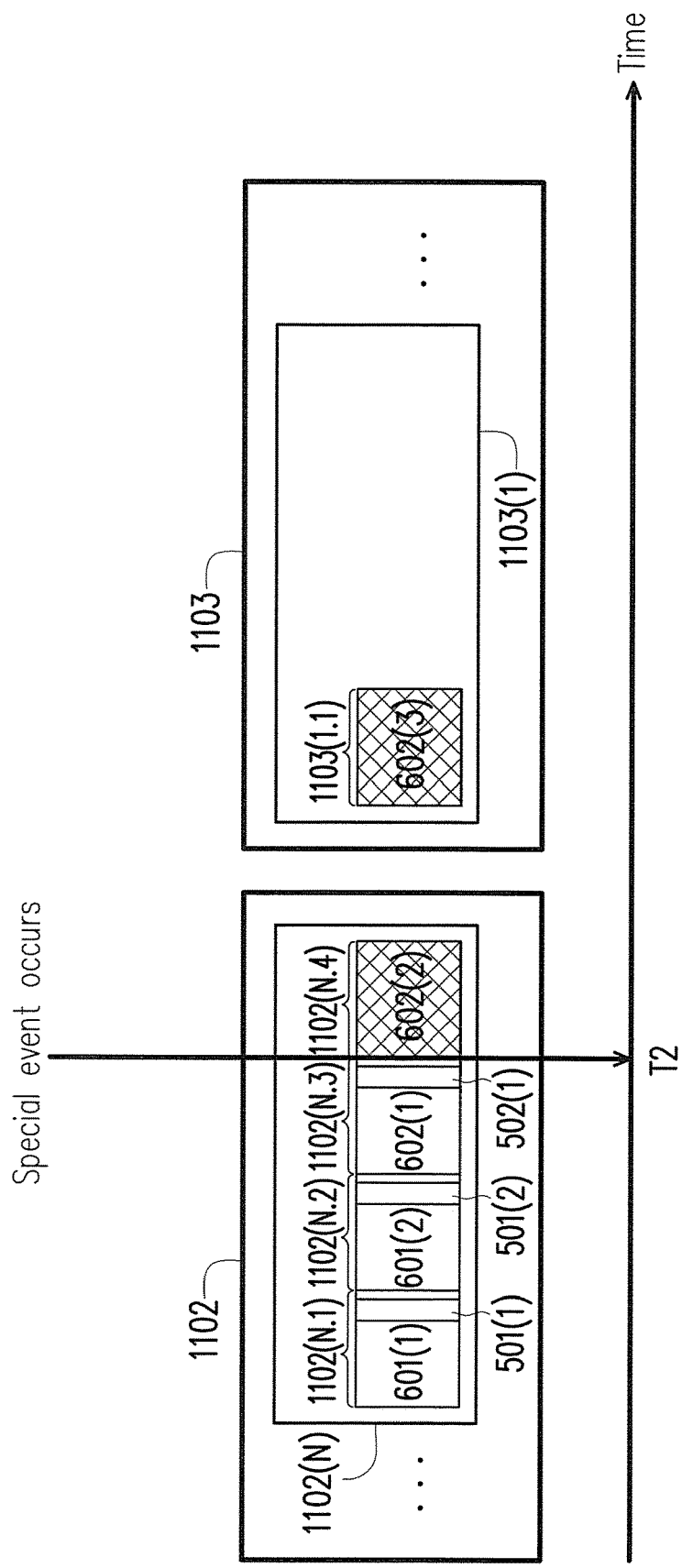
FIG. 6A is a schematic diagram illustrating an atomic write operation according to the second embodiment of the invention.
Figure 6B:
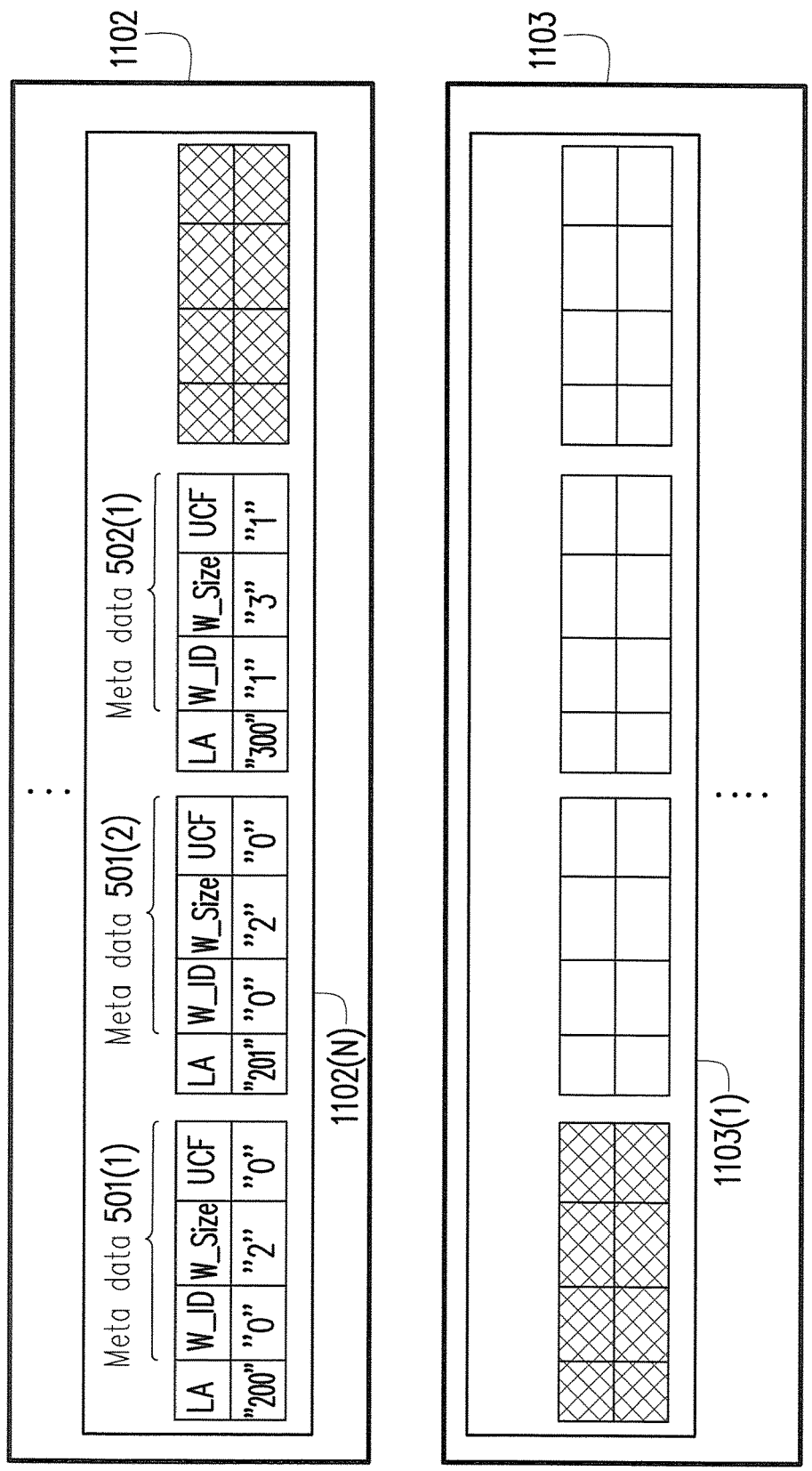
FIG. 6B is a schematic diagram illustrating a meta data corresponding to the atomic write operation illustrated in FIG. 6A according to the second embodiment of the invention.

FIG. 6A is a schematic diagram illustrating an atomic write operation according to the second embodiment of the invention. FIG. 6B is a schematic diagram illustrating a meta data corresponding to the atomic write operation illustrated in FIG. 6A according to the second embodiment of the invention.

Referring to FIGS. 6A and 6B, the first atomic write command, the second atomic write command and the hardware components in the second embodiment are identical to those in the first embodiment. The difference between the second embodiment and the first embodiment is that, the special event occurs at a time point T2 in the second embodiment.

Specifically, after the processor 211 writes the write data 602(1) and the meta 502(1) into the physical sub-unit 1102(N.3) according to the second atomic write command, the special event takes place in the storage device 20 at the time point T2. In other words, none of the write data 602(2) and the meta data 502(2) to be written into the physical sub-unit 1102(N.4) and the write data 602(3) and the meta data 502(3) to be written into the physical sub-unit 1103(1.1) is being written (represented in diamond-shaped grid lines).

After the power is restored, the processor 211 determines whether the write data (the stored write data) corresponding to the second atomic write command is valid or invalid, so as to determine how to perform the data recovery operation correspondingly.

As described above, the processor 211 identifies that the physical block 1102 is the open physical block. Next, the processor 211 identifies that the physical sub-unit 1102(N.3) is the last physical sub-unit stored with data in the physical block 1102. Next, the processor 211 identifies the meta data 502(1) corresponding to the physical sub-unit 502(1) and obtains information recorded by the meta data 502(1) (e.g., the write identification code being "1", the write size being "3" and the unit crossing flag being "1").

Next, the processor 211 determines whether any meta data belonging to the second atomic write command is arranged before the meta data 502(1) according to the meta data 502(1). For example, to determine whether there is a physical sub-unit closely adjacent before the physical sub-unit 1102(N.3) and to determine whether the write identification code of the meta data stored therein is identical to the write identification code (e.g., "1") of the meta data 502(1). In this example, although the physical sub-unit 1102(N.2) is closely adjacent before the physical sub-unit 1102(N.3), however, the write identification code (e.g., "0") of the corresponding meta data 501(2) is different from the write identification code of the meta data 502(1). Therefore, the processor 211 determines that only the meta data 502(1) is the meta data corresponding to the second atomic write command and a total quantity of meta data currently corresponding to the second atomic write command is 1.

Next, the processor 211 compares whether the total quantity of meta data corresponding to the second atomic write command is equal to the write size of the meta data corresponding to the second atomic write command so as to determine whether the (stored) write data corresponding to the second atomic write command is valid or invalid. Next, the processor 211 determines whether it is required to re-execute the second atomic write command according to whether a logical sub-unit, as instructed by the second atomic write command, has been written into a valid data before. In this example, because the total quantity of meta data corresponding to the second atomic write command is not equal to the write size of the meta data corresponding to the second atomic write command, the processor 211 determines that the write data 602(1) corresponding to the second atomic write command is invalid (also determines that the second atomic write command is unsuccessful). The write data 602(1) already being written (stored) will be marked as invalid. The host system can inquire whether the second atomic write command is successfully executed or whether the written write data corresponding to the second atomic write command is valid. The processor 211 sends said information regarding whether the second atomic write command is successfully executed or whether the written write data corresponding to the second atomic write command is valid back to the host system.

After receiving the information regarding whether the second atomic write command is successfully executed or whether the written write data corresponding to the second atomic write command is valid, the host system instructs the processor 211 to perform the data recovery operation correspondingly. Specifically, during the correspondingly performed data recovery operation, according the logical sub-unit corresponding to the written data determined as invalid, the processor 211 restores the valid data stored by that logical sub-unit. More specifically, in the present embodiment, if the write data 602(1) corresponding to the second atomic write command is determined as invalid, the processor 211 determines whether a logical address "300" is already stored with an old valid data before storing the write data 602(1) according to the logical address "300" stored by the data 602(1). If the logical address "300" is already stored with the old valid data before storing the write data 602(1), the processor 211 will use the old valid data previously stored by the logical address "300" as the valid data for updating the logical to physical address mapping table or the physical to logical address mapping table. For instance, the processor 211 can map the physical sub-unit originally stored with the old valid data to the logical address "300". Otherwise, if the logical address "300" is not stored with the old valid data before storing the write data 602(1), the processor 211 directly re-executes the second atomic write command (for performing the data recovery operation).

THIRD EMBODIMENT

Figure 7A:
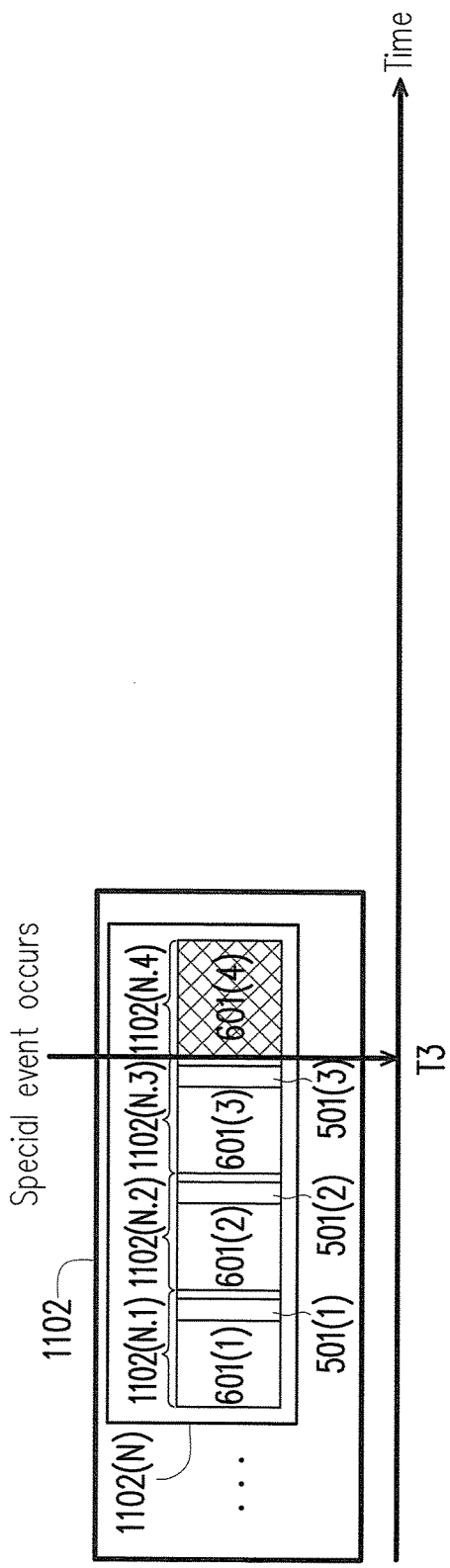
FIG. 7A is a schematic diagram illustrating an atomic write operation according to the third embodiment of the invention.
Figure 7B:
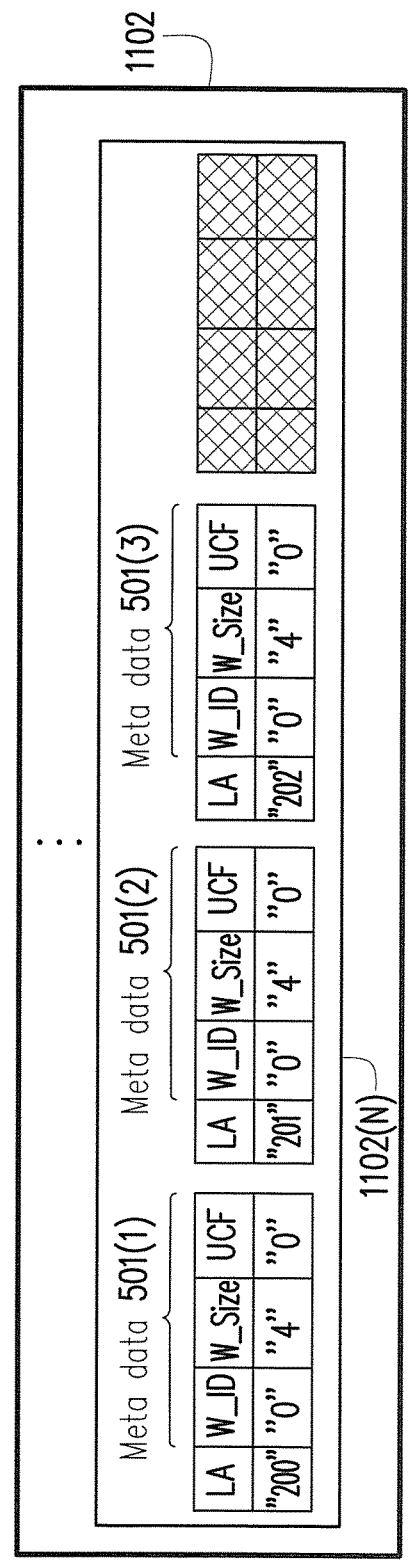
FIG. 7B is a schematic diagram illustrating a meta data corresponding to the atomic write operation illustrated in FIG. 7A according to the third embodiment of the invention.

FIG. 7A is a schematic diagram illustrating an atomic write operation according to the third embodiment of the invention. FIG. 7B is a schematic diagram illustrating a meta data corresponding to the atomic write operation illustrated in FIG. 7A according to the third embodiment of the invention. Referring to FIGS. 7A and 7B, the hardware components in the third embodiment are identical to those of the first embodiment. The difference between the third embodiment and the first embodiment is that, in the third embodiment, the first atomic write command is configured to instruct storing the write data 601(1), 601(2), 601(3) and 601(4) to logical addresses "200", "201", "202" and "203" respectively. Also, the special event occurs at a time point T3 after the write data 601(3) and the corresponding meta data 501(3) are written into the physical sub-unit 1102(N.3).

In the example above, each of the meta data 501(1), 501(2) and 501(3) has the write identification code being "0", the write size being "4" and the unit crossing flag marked as "0", and the open physical block is the physical block 1102. Next, the processor 211 identifies that the physical sub-unit 1102(N.3) is the last physical sub-unit stored with data in the physical block 1102. Next, the processor 211 identifies the meta data 501(3) corresponding to the physical sub-unit 1102(N.3) and obtains information recorded by the meta data 501(3).

Next, the processor 211 determines whether the meta data belonging to the first atomic write command is arranged before the meta data 501(3). For example, whether there is a physical sub-unit closely adjacent before the physical sub-unit 1102(N.3) and whether the write identification code of the meta data stored therein is identical to the write identification code (e.g., "0") of the meta data 501(3) are determined. In this example, the physical sub-units 1102(N.1) and 1102(N.2) are adjacent before the physical sub-unit 1102(N.3) (wherein the physical sub-units 1102(N.2) is closely adjacent before the physical sub-unit 1102(N.3), and the physical sub-units 1102(N.1) is closely adjacent before the physical sub-unit 1102(N.2)), and the write identification code (e.g., "0") of each of the corresponding meta data 501(1) and 501(2) is identical to the write identification code of the meta data 501(3). Therefore, the processor 211 determines that the meta data corresponding to the first atomic write command are the meta data 501(1), 501(2) and 501(3), and the total quantity of meta data currently corresponding to the first atomic write command is 3 (there are three meta data corresponding to the first atomic write command in total).

In this example, because the total quantity of meta data corresponding to the first atomic write command is not equal to the write size of the meta data corresponding to the first atomic write command (i.e., 3≠4), the processor 211 determines that the write data 601(1), 601(2) and 601(3) are invalid and marks the written data 601(1), 601(2) and 601(3) as invalid. The method of determining whether the write data is valid or invalid by using the unit crossing flag (block crossing flag) is described below with reference to the fourth embodiment.

FOURTH EMBODIMENT

Figure 8A:
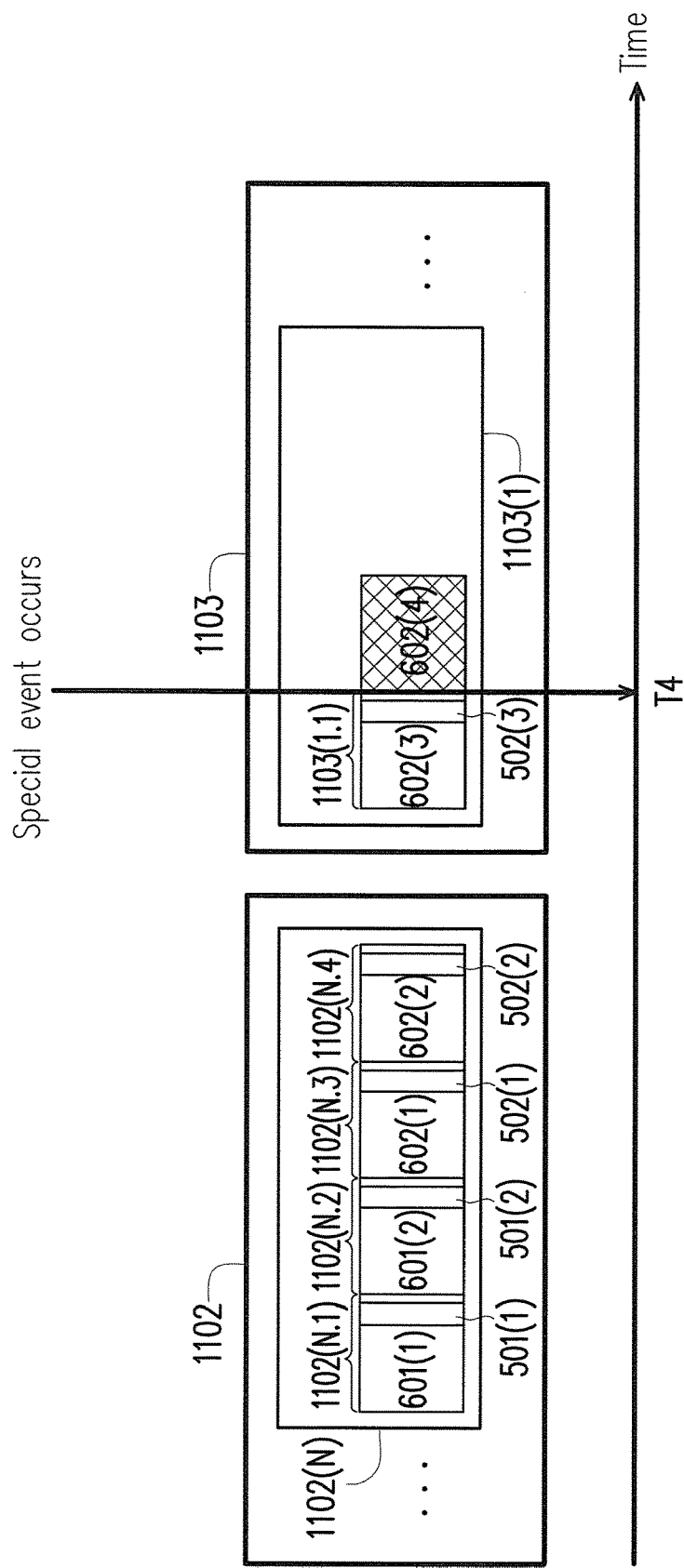
FIG. 8A is a schematic diagram illustrating an atomic write operation according to the fourth embodiment of the invention.
Figure 8B:
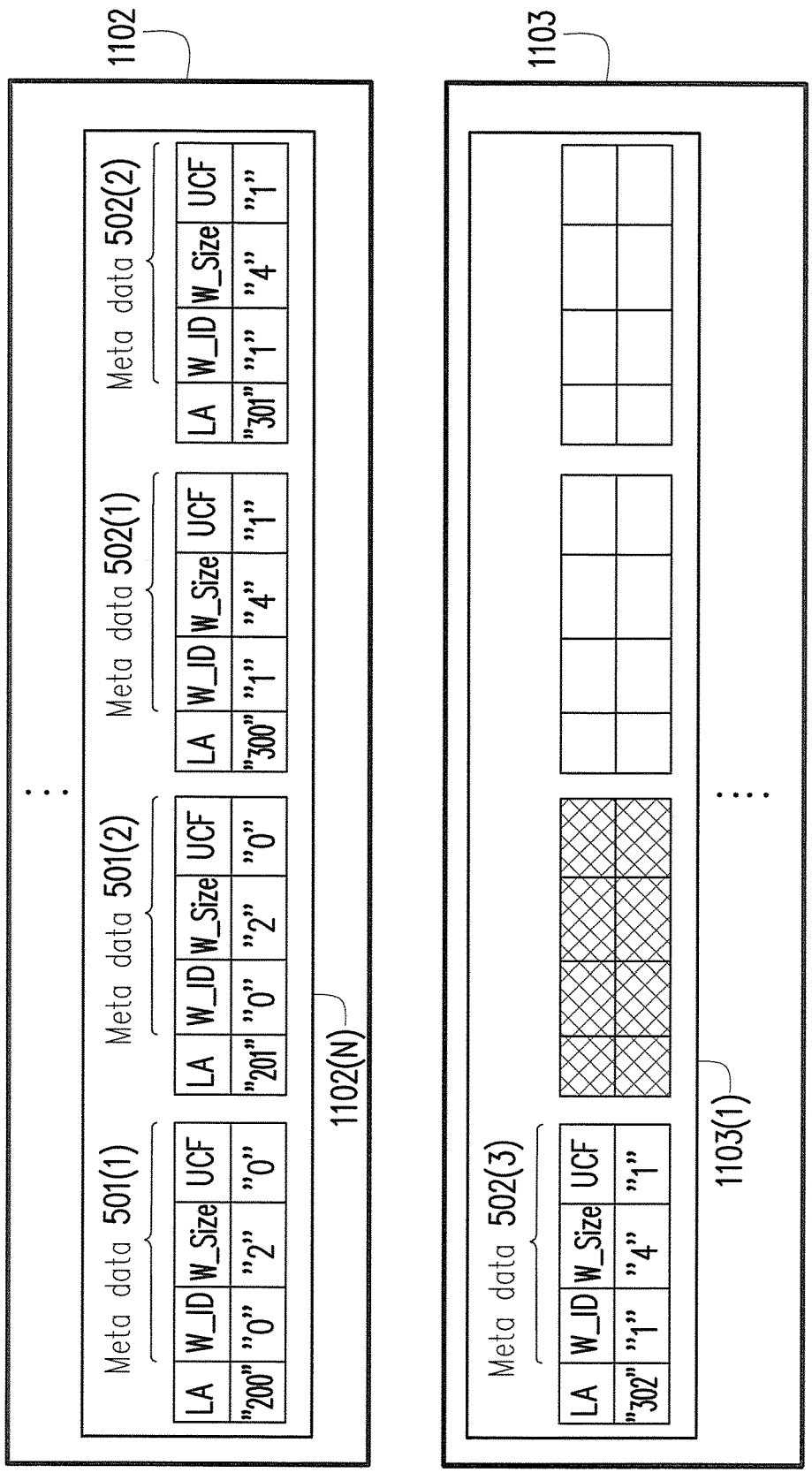
FIG. 8B is a schematic diagram illustrating a meta data corresponding to the atomic write operation illustrated in FIG. 8A according to the fourth embodiment of the invention.

FIG. 8A is a schematic diagram illustrating an atomic write operation according to the fourth embodiment of the invention. FIG. 8B is a schematic diagram illustrating a meta data corresponding to the atomic write operation illustrated in FIG. 8A according to the fourth embodiment of the invention.

Referring to FIGS. 8A and 8B, the hardware components in the fourth embodiment are identical to those of the first embodiment. The difference between the fourth embodiment and the first embodiment is that, in the fourth embodiment, the first atomic write command is configured to instruct storing the write data 602(1) and 602(2) to logical addresses "200" and "201" respectively, and the second atomic write command is configured to instruct writing the write data 602(1), 602(2), 602(3) and 602(4) to logical addresses "300", "301", "302" and "303" respectively. Also, the special event occurs at a time point T4 after the write data 602(3) and the corresponding meta data 502(3) are written into the physical sub-unit 1103(1.1).

In the example above, each of the meta data 501(1) and 501(2) has the write identification code being "0", the write size being "2" and the unit crossing flag being "0", each of the meta data 502(1), 502(2) and 502(3) has the write identification code being "1", the write size being "4" and the unit crossing flag marked as "1", and the open physical block is the physical block 1103. Next, the processor 211 identifies that the physical sub-unit 1103(1.1) is the last physical sub-unit stored with data in the physical block 1103. Next, the processor 211 identifies the meta data 502(3) corresponding to the physical sub-unit 1103(1.1) and obtains information recorded by the meta data 502(3).

Next, the processor 211 determines whether the meta data belonging to the first atomic write command is arranged before the meta data 502(3) in the open physical block 1103. For example, whether there is a physical sub-unit closely adjacent before the physical sub-unit 1103(1.1) and whether the write identification code of the meta data stored therein is identical to the write identification code (e.g., "1") of the meta data 502(3) are determined. In the open physical block 1103, no physical sub-unit is present before the physical sub-unit 1103(1.1). However, in the present embodiment, the processor 211 determines whether a close physical block closely adjacent before the open physical block needs to be checked according to the unit crossing flag of the meta data 502(3). Herein, the physical unit identification code of the close physical unit 1102 closely adjacent before the open physical unit 1103 is the physical unit identification code of the open physical unit minus one, or the physical unit identification code of the close physical unit 1102 is a previous number of the physical unit identification code of the open physical unit 1103.

Because the unit crossing flag (the block crossing flag) of the meta data 502(3) is recorded as "1", the processor 211 determines that there may be other physical sub-units that also belong to the second atomic write command as the physical sub-unit 1103(1.1) does in the physical block closely adjacent before the physical block 1103 to which the physical sub-unit 1103(1.1) corresponding to the meta data 502(3) belongs. Next, the processor 211 checks whether any physical sub-unit closely adjacent to the physical sub-unit 1103(1.1) (in the manner of the physical addresses) is present in the physical block 1102 closely adjacent before the physical block 1103, and determines whether the write identification code of the meta data corresponding to such physical sub-unit is identical to the write identification code of the meta data 502(3) of the physical sub-unit 1103(1.1). In the example of FIGS. 8A and 8B, the processor 211 identifies that the write identification code of each of the meta data 502(1) and 502(2) corresponding to the physical sub-units 1102(N.3) and 1102(N.4) is identical to the write identification code of the meta data 502(3), and the physical sub-units 1102(N.3) and 1102(N.4) are adjacent to the physical sub-unit 1103(1.1). Therefore, the processor 211 determines that the meta data corresponding to the second atomic write command are the meta data 502(1), 502(2) and 502(3), and the total quantity of meta data currently corresponding to the second atomic write command is 3 (there are three meta data corresponding to the second atomic write command in total).

In this example, because the total quantity of meta data corresponding to the second atomic write command (e.g., "3") is not equal to the write size of the meta data corresponding to the second atomic write command (e.g., "4"), the processor 211 determines that the write data 602(1), 602(2) and 602(3) corresponding to the second atomic write command are invalid (determines that the second atomic operation is unsuccessful). Further, the write data 602(1), 602(2) and 602(3) already being written will be marked as invalid.

It is noted that, the foregoing embodiments are all described by using one single channel having multiple physical block. Nonetheless, in other embodiments, the storage device 20 may also include a plurality of channels, each of the channels has an equal number of physical blocks, and the physical block identification codes (also known as the physical unit identification codes) of the physical blocks with the same order among the channels are identical to one another. For instance, it is assumed that the rewritable non-volatile memory module 220 has two channels, which are a first channel and a second channel. Each channel has 26 physical blocks, and the physical block identification codes of the 26 physical blocks in each channel are "A", "B", . . . , "Y" and "Z" in that sequence. In this example, the memory interface control circuit 213 preferentially programs data into the open physical block (assuming that the physical block identification code of this physical block is "A") of the first channel. Next, if the physical block "A" is fully written and there is still data to be written, the memory interface control circuit 213 selects the physical block "A" having the same physical block identification code in the second channel for programming the remaining data. In other words, for the physical blocks having the same physical block identification code, a sequential order of the physical blocks is distinguished for data writing or a sequential order of the physical addresses of the physical blocks is determined according to the sequence of the channels. From another perspective, assuming that the physical block "Z" of the second channel is the open physical block, after the meta data of the last physical sub-unit stored with data in the physical block "Z" is identified, whether other physical sub-units/meta data that belong to the same write command are present in the physical blocks "Z" of the first channel and the second channel are then checked. In addition, in this example, in the first channel and the second channel, the physical block having the physical block identification code "Y" (arranged to be adjacent after the block identification code "X") is regarded as closely adjacent before the physical block "Z". For example, the sequence in the manner of physical addresses is: the physical block "Y" of the first channel, the physical block "Y" of the second channel, the physical block "Z" of the first channel and the physical block "Z" of the second channel.

In summary, the data writing method and the storage controller provided in the embodiments of the invention can write the meta data corresponding to the write data with specific settings may be written after writing the write data into the rewritable non-volatile memory module. As a result, when the special event occurs, whether the written write data is valid or invalid may be determined according to the write data and the meta data, so the data recovery operation may be performed correspondingly.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data writing method, adapted to a storage device having a rewritable non-volatile memory module, wherein the rewritable non-volatile memory module has a plurality of physical units, each physical unit among the physical units has a plurality of physical sub-units, and the method comprises:

writing a first write data into a first physical sub-unit in the rewritable non-volatile memory module according to a first write command;

recording a first meta data corresponding to the first write data and writing the first meta data into the rewritable non-volatile memory module after writing the first write data, wherein the first meta data comprises a first write identification code, a first write size and a first unit crossing flag, wherein the first write identification code is either a first value or a second value, and the first value is different from the second value;

writing a second write data into a second physical sub-unit in the rewritable non-volatile memory module;

recording a second meta data corresponding to the second write data and writing the second meta data into the rewritable non-volatile memory module after writing the second write data, wherein the second meta data comprises a second write identification code, a second write size and a second unit crossing flag, wherein the second write identification code of the second meta data is set to be different from the first write identification code of the first meta data if the second physical sub-unit is closely adjacent to the first physical sub-unit and the second write data is written according to a second write command different from the first write command, wherein the second write identification code of the second meta data is set to be identical to the first write identification code of the first meta data if the second write data is written according to the first write command; and determining whether the second write data is valid or invalid according to the second write data and the second meta data if a special event occurs.

2. The data writing method according to claim 1, wherein the second meta data is set to be identical to the first meta data if the second write data is written according to the first write command, and the method further comprises:

calculating the first write size of the first meta data according to the first write command and a preset access unit size;

setting the first unit crossing flag to be a third value if the first physical sub-unit and the second physical sub-unit belong to the physical units having different physical unit identification codes, respectively; and setting the first unit crossing flag to be a fourth value if the first physical sub-unit and the second physical sub-unit belong to at least one of the physical units having identical physical unit identification codes, wherein the third value is different from the fourth value.

3. The data writing method according to claim 2, wherein the first write command is configured to instruct writing the first write data and the second write data into a first logical sub-unit and a second logical sub-unit respectively, wherein the step of calculating the first write size of the first meta data according to the first write command and the preset access unit size comprises:

dividing a sum of sizes of the first logical sub-unit and the second logical sub-unit by the preset access unit size to obtain a quotient value; and using a value obtained by rounding up the quotient value to integer as the first write size.

4. The data writing method according to claim 1, wherein the physical unit to which the second physical sub-unit belongs is an open physical unit, wherein the step of determining whether the second write data is valid or invalid according to the second write data and the second meta data comprises:
  identifying a last physical sub-unit of the physical sub-units stored with data in the open physical unit;
  if the second physical sub-unit is identified as the last physical sub-unit of the physical sub-units stored with data in the open physical unit, identifying the second meta data corresponding to the second physical sub-unit;
  determining whether at least one third physical sub-unit is present in the open physical unit, wherein if the at least one third physical unit is determined as present in the open physical unit, the at least one third physical sub-unit in the open physical unit is closely adjacent before the second physical sub-unit and a third write identification code in at least one third meta data corresponding to the at least one third physical sub-unit is identical to the second write identification code;
  summing up a quantity of the at least one third physical meta data and a quantity of the second meta data to be a total quantity of meta data if the at least one third physical sub-unit is present, wherein the second write data is determined as invalid if the total quantity of meta data is not equal to the second write size; and
  using the quantity of the second meta data as the total quantity of meta data if the at least one third physical sub-unit is not present, wherein the second write data is determined as invalid if the total quantity of meta data is not equal to the second write size.

5. The data writing method according to claim 4, wherein the step of determining whether the second write data is valid or invalid according to the second write data and the second meta data further comprises:
  determining whether a close physical unit closely adjacent before the open physical unit needs to be checked according to the second unit crossing flag;
  determining whether at least one fourth physical sub-unit is present in the close physical unit if determining that the close physical unit closely adjacent before the open physical unit needs to be checked,
  wherein conditions for determining that the at least one fourth physical sub-unit is present in the close physical unit comprise:
    the at least one fourth physical sub-unit is closely adjacent before the at least one third physical sub-unit and a fourth write identification code in a fourth meta data corresponding to the at least one fourth physical sub-unit is identical to the second write identification code; or
    the at least one fourth physical sub-unit is closely adjacent before the second physical sub-unit and the fourth identification code in the fourth meta data corresponding to the at least one fourth physical sub-unit is identical to the second write identification code;
  summing up a quantity of the at least fourth meta data, the quantity of the at least one third meta data and the quantity of the second meta data to be the total quantity of meta data if the at least one fourth physical sub-unit is present in the close physical unit and the at least one third physical sub-unit is present in the open physical unit, wherein the second write data is determined as invalid if the total quantity of meta data is not equal to the second write size; and
  summing up the quantity of the at least one fourth meta data and the quantity of the second meta data to be the total quantity of meta data if the at least one fourth physical sub-unit is present in the close physical unit and the at least one third physical sub-unit is not present in the open physical unit, wherein the second write data is determined as invalid if the total quantity of meta data is not equal to the second write size.

6. A storage controller, configured to control a storage device having a rewritable non-volatile memory module, the storage controller comprising:
  a connection interface circuit, configured to couple to a host system;
  a memory interface control circuit, configured to couple to the rewritable non-volatile memory module, wherein the rewritable non-volatile memory module has a plurality of physical units, and each physical unit among the physical units has a plurality of physical sub-units;
  a processor, coupled to the connection interface circuit and the memory interface control circuit; and
  a data management circuit, coupled to the processor, the connection interface circuit and the memory interface control circuit,
  wherein the processor writes a first write data into a first physical sub-unit in the rewritable non-volatile memory module according to a first write command,
  wherein the data management circuit records a first meta data corresponding to the first write data and the processor instructs the memory interface control circuit to write the first meta data into the rewritable non-volatile memory module after writing the first write data, wherein the first meta data comprises a first write identification code, a first write size and a first unit crossing flag, wherein the write identification code is either a first value or a second value, and the first value is different from the second value,
  wherein the processor instructs the memory interface control circuit to write a second write data into a second physical sub-unit in the rewritable non-volatile memory module,
  wherein the data management circuit records a second meta data corresponding to the second write data and the processor instructs the memory interface control circuit to write the second meta data into the rewritable non-volatile memory module after writing the second write data, wherein the second meta data comprises a second write identification code, a second write size and a second unit crossing flag, wherein the data management circuit sets the second write identification code of the second meta data to be different from the first write identification code of the first meta data if the second physical sub-unit is closely adjacent to the first physical sub-unit and the second write data is written according to a second write command different from the first write command, wherein the data management circuit sets the second write identification code of the second meta data to be identical to the first write identification code of the first meta data if the second write data is written according to the first write command,
  wherein the processor determines whether the second write data is valid or invalid according to the second write data and the second meta data if a special event occurs.

7. The storage controller according to claim 6, wherein the data management circuit sets the second meta data to be identical to the first meta data if the second write data is written according to the first write command, wherein
the data management circuit calculates the first write size of the first meta data according to the first write command and a preset access unit size;
the data management circuit sets the first unit crossing flag to be a third value if the first physical sub-unit and the second physical sub-unit belong to the physical units having different physical unit identification codes, respectively; and
the data management circuit sets the first unit crossing flag to be a fourth value if the first physical sub-unit and the second physical sub-unit belong to at least one of the physical units having identical physical unit identification codes, wherein the third value is different from the fourth value.

8. The storage controller according to claim 7, wherein the first write command is configured to instruct writing the first write data and the second write data into a first logical sub-unit and a second logical sub-unit respectively, wherein in the operation where the data management circuit calculates the first write size of the first meta data according to the first write command and the preset access unit size,
the data management circuit divides a sum of sizes of the first logical sub-unit and the second logical sub-unit by the preset access unit size to obtain a quotient value,
wherein the data management circuit uses a value obtained by rounding up the quotient value to integer as the first write size.

9. The storage controller according to claim 6, wherein the physical unit to which the second physical sub-unit belongs is an open physical unit, wherein in the operation where the processor determines whether the second write data is valid or invalid according to the second write data and the second meta data,
the processor identifies a last physical sub-unit of the physical sub-units stored with data in the open physical unit,
wherein the processor identifies the second meta data corresponding to the second physical sub-unit if the second physical sub-unit is identified as the last physical sub-unit of the physical sub-units stored with data in the open physical unit,
wherein the processor determines whether at least one third physical sub-unit is present in the open physical unit, wherein if the at least one third physical unit is determined as present in the open physical unit, the at least one third physical sub-unit in the open physical unit is closely adjacent before the second physical sub-unit and a third write identification code in a third meta data corresponding to the at least one third physical sub-unit is identical to the second write identification code,
wherein the processor sums up a quantity of the at least one third physical meta data and a quantity of the second meta data to be a total quantity of meta data if the at least one third physical sub-unit is present, wherein the processor determines the second write data as invalid if the total quantity of meta data is not equal to the second write size,
wherein the processor uses the quantity of the second meta data as the total quantity of meta data if the at least one third physical sub-unit is not present, wherein the processor determines the second write data as invalid if the total quantity of meta data is not equal to the second write size.

10. The storage controller according to claim 9, wherein in the operation where the processor determines whether the second write data is valid or invalid according to the second write data and the second meta data,
the processor determines whether a close physical unit closely adjacent before the open physical unit needs to be checked according to the second unit crossing flag,
wherein the processor determines whether at least one fourth physical sub-unit is present in the close physical unit if the processor determines that the close physical unit closely adjacent before the open physical unit needs to be checked,
wherein conditions for determining that the at least one fourth physical sub-unit is present in the close physical unit comprise:
the at least one fourth physical sub-unit is closely adjacent before the at least one third physical sub-unit and a fourth write identification code in a fourth meta data corresponding to the at least one fourth physical sub-unit is identical to the second write identification code; or
the at least one fourth physical sub-unit is closely adjacent before the second physical sub-unit and the fourth identification code in the fourth meta data corresponding to the at least one fourth physical sub-unit is identical to the second write identification code,
wherein the processor sums up a quantity of the at least fourth meta data, the quantity of the at least one third meta data and the quantity of the second meta data to be the total quantity of meta data if the at least one fourth physical sub-unit is present in the close physical unit and the at least one third physical sub-unit is present in the open physical unit, wherein the processor determines the second write data as invalid if the total quantity of meta data is not equal to the second write size,
the processor sums up the quantity of the at least one fourth meta data and the quantity of the second meta data to be the total quantity of meta data if the at least one fourth physical sub-unit is present in the close physical unit and the at least one third physical sub-unit is not present in the open physical unit, wherein the processor determines the second write data as invalid if the total quantity of meta data is not equal to the second write size.

* * * * *